(12) United States Patent
Koda et al.

(10) Patent No.: US 8,203,927 B2
(45) Date of Patent: *Jun. 19, 2012

(54) INFORMATION RECORDING MEDIUM, INFORMATION RECORDING APPARATUS AND METHOD, AND COMPUTER PROGRAM

(75) Inventors: Takeshi Koda, Saitama (JP); Keiji Katata, Saitama (JP); Masahiro Kato, Saitama (JP); Masayoshi Yoshida, Saitama (JP); Masahiro Miura, Saitama (JP); Eiji Muramatsu, Saitama (JP); Shoji Taniguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 1008 days.

This patent is subject to a terminal disclaimer.

(21) Appl. No.: 12/158,585

(22) PCT Filed: Dec. 20, 2006

(86) PCT No.: PCT/JP2006/325385
§ 371 (c)(1),
(2), (4) Date: Jul. 1, 2008

(87) PCT Pub. No.: WO2007/072861
PCT Pub. Date: Jun. 28, 2007

(65) Prior Publication Data
US 2009/0268596 A1 Oct. 29, 2009

(30) Foreign Application Priority Data
Dec. 21, 2005 (JP) ................................. 2005-368636

(51) Int. Cl.
*G11B 7/24* (2006.01)

(52) U.S. Cl. .................................. 369/275.1; 369/275.2
(58) Field of Classification Search ............... 369/275.1, 369/275.2, 275.3, 275.4, 94
See application file for complete search history.

(56) References Cited

U.S. PATENT DOCUMENTS

| 7,801,015 | B2 * | 9/2010 | Yoshida et al. | 369/275.3 |
| 7,940,635 | B2 * | 5/2011 | Katata et al. | 369/275.3 |
| 2004/0174803 | A1 * | 9/2004 | Carson | 369/275.4 |
| 2005/0213481 | A1 * | 9/2005 | Ando et al. | 369/275.3 |

FOREIGN PATENT DOCUMENTS

| JP | 2000-311346 | 11/2000 |
| JP | 2001-23237 | 1/2001 |
| JP | 2003-173626 | 6/2003 |
| JP | 2005-129120 | 5/2005 |

OTHER PUBLICATIONS

International Search Report PCT/JP2006/325385.

* cited by examiner

*Primary Examiner* — Hoa T Nguyen
*Assistant Examiner* — Andrew Sasinowski
(74) *Attorney, Agent, or Firm* — Young & Thompson

(57) ABSTRACT

An information recording medium (100) is provided with: a data recording area (105, 115) to which one attribute, which corresponds to recorded data, of a plurality of types of attributes is given in each of segmentized area units; and an address recording area (1031, 1032) to record therein an address (AD0-1, AD1-1) of an edge portion on an outermost side of a recording area, which is a continuous recording area to which a data area attribute of the plurality of types of attributes is given and which is a recording area closest to an edge portion on an innermost side of said data recording area, the data area attribute indicating a status that user data is recorded as the data.

4 Claims, 12 Drawing Sheets

[FIG. 1]
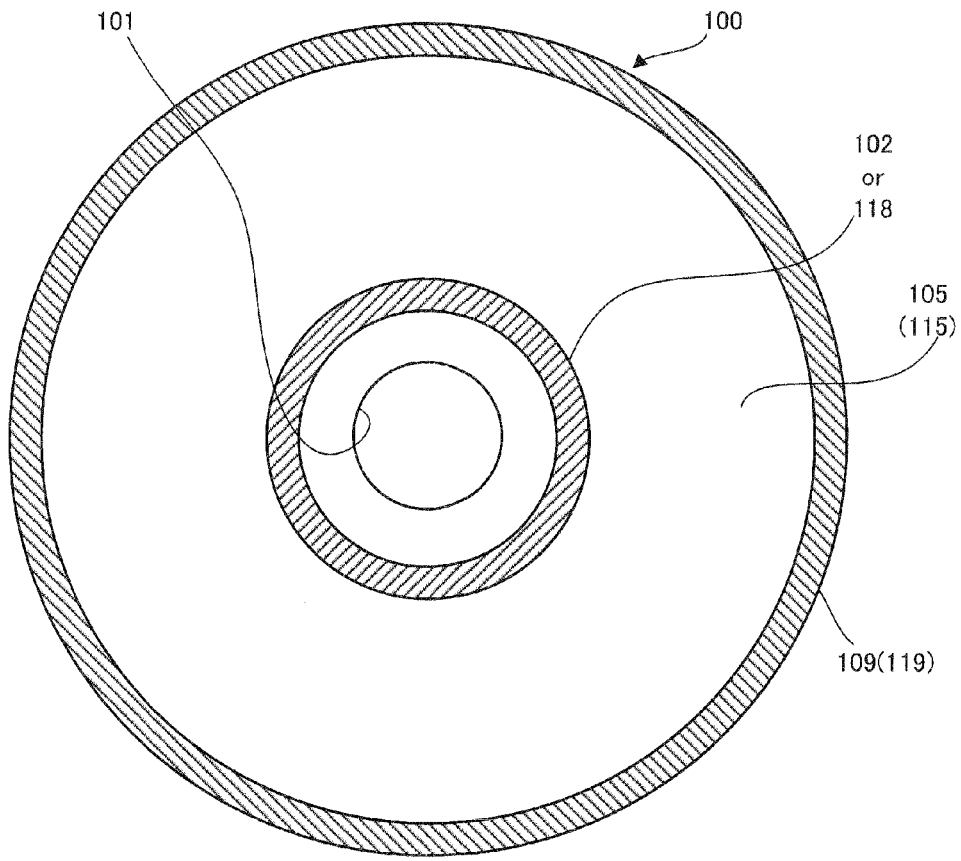
(a)
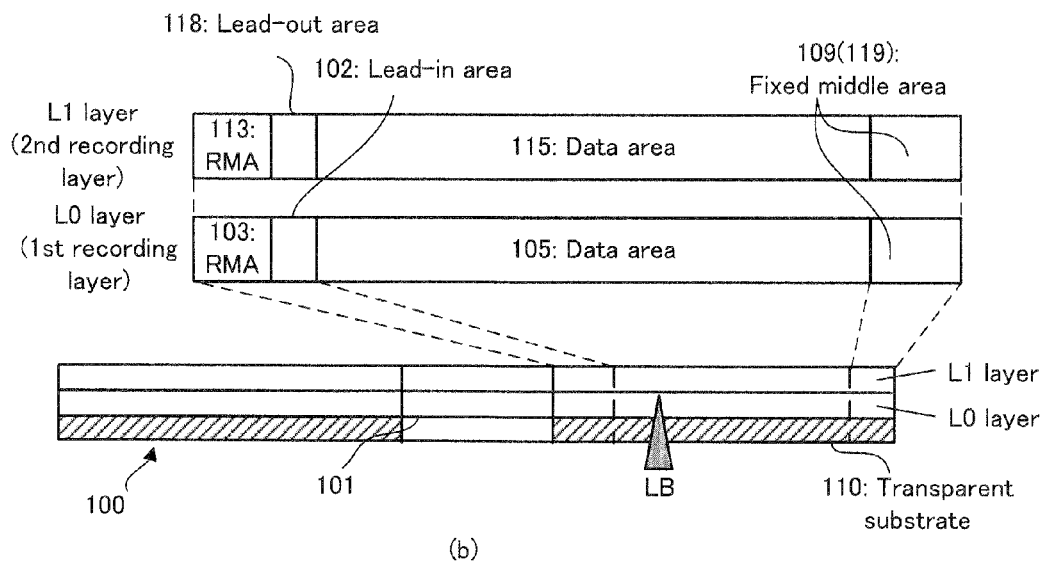
(b)

[FIG. 2]
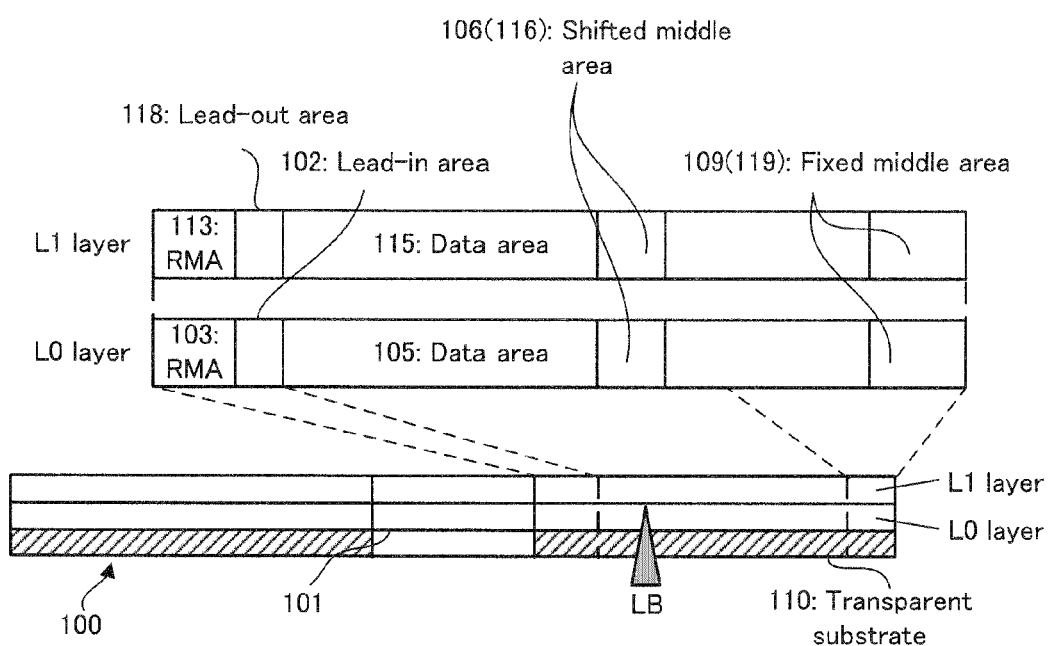

[FIG. 3]
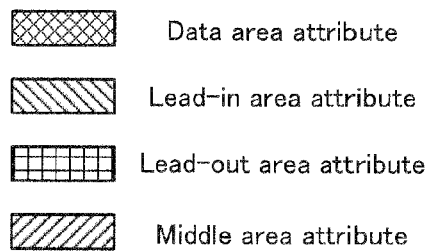
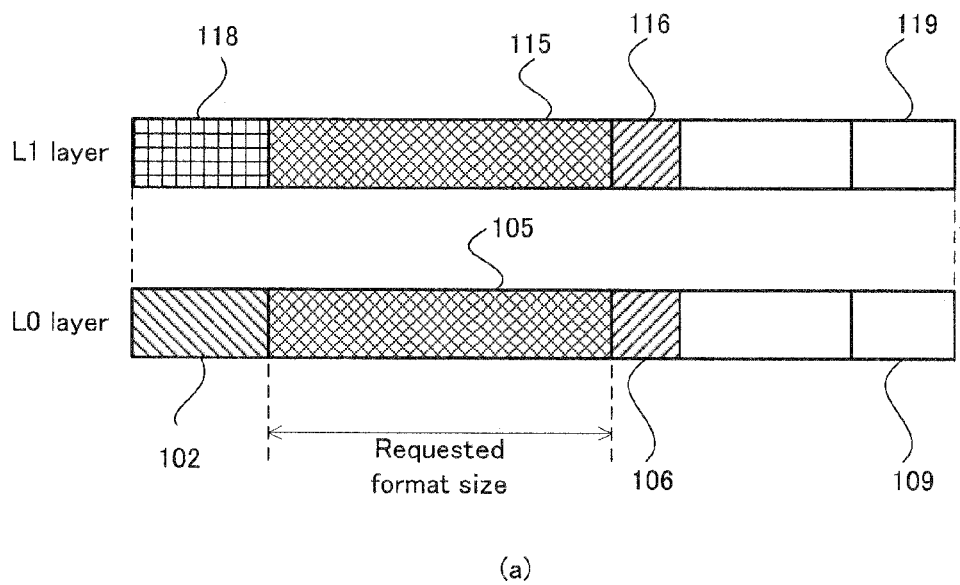
(a)
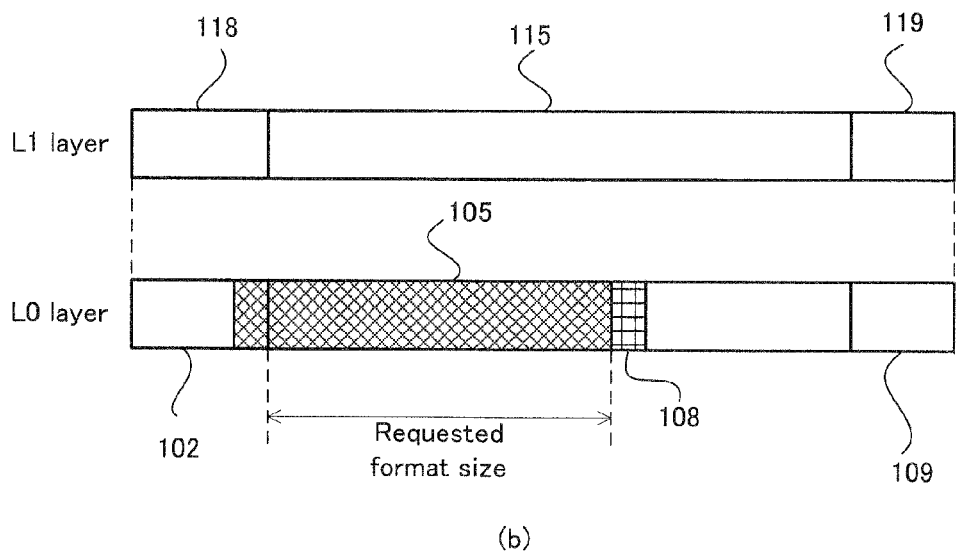
(b)

[FIG. 4]
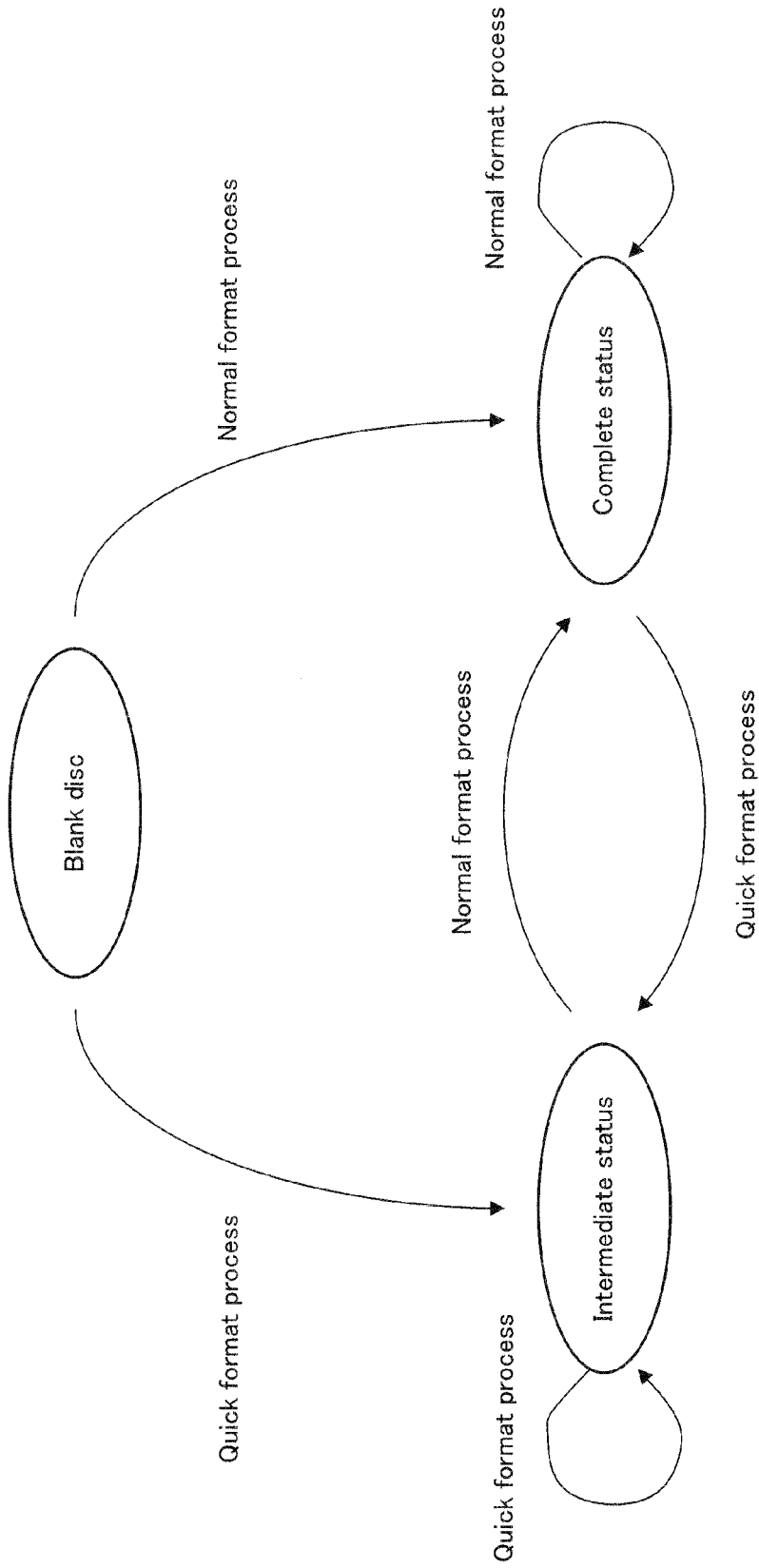

[FIG. 5]
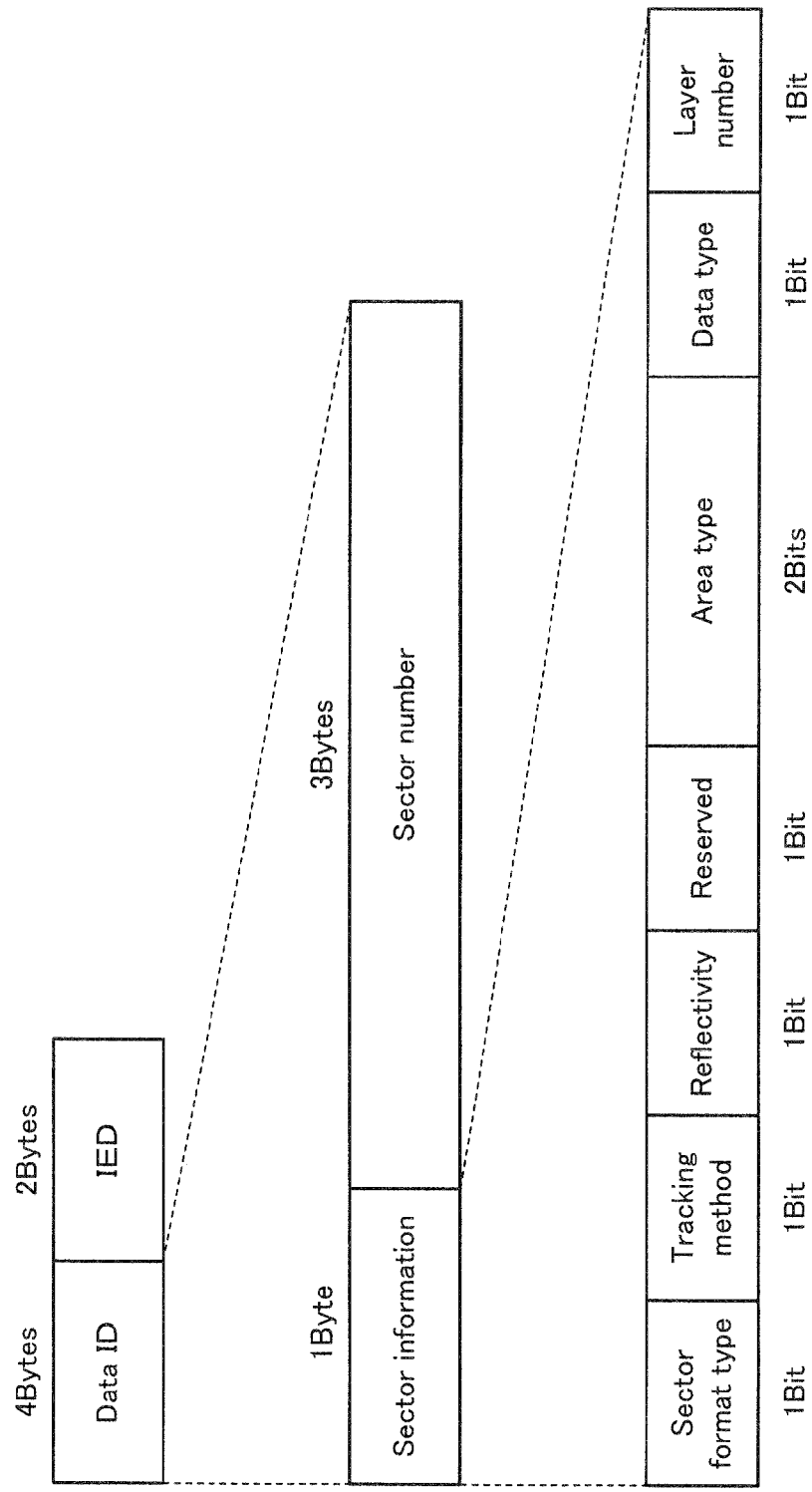

[FIG. 6]
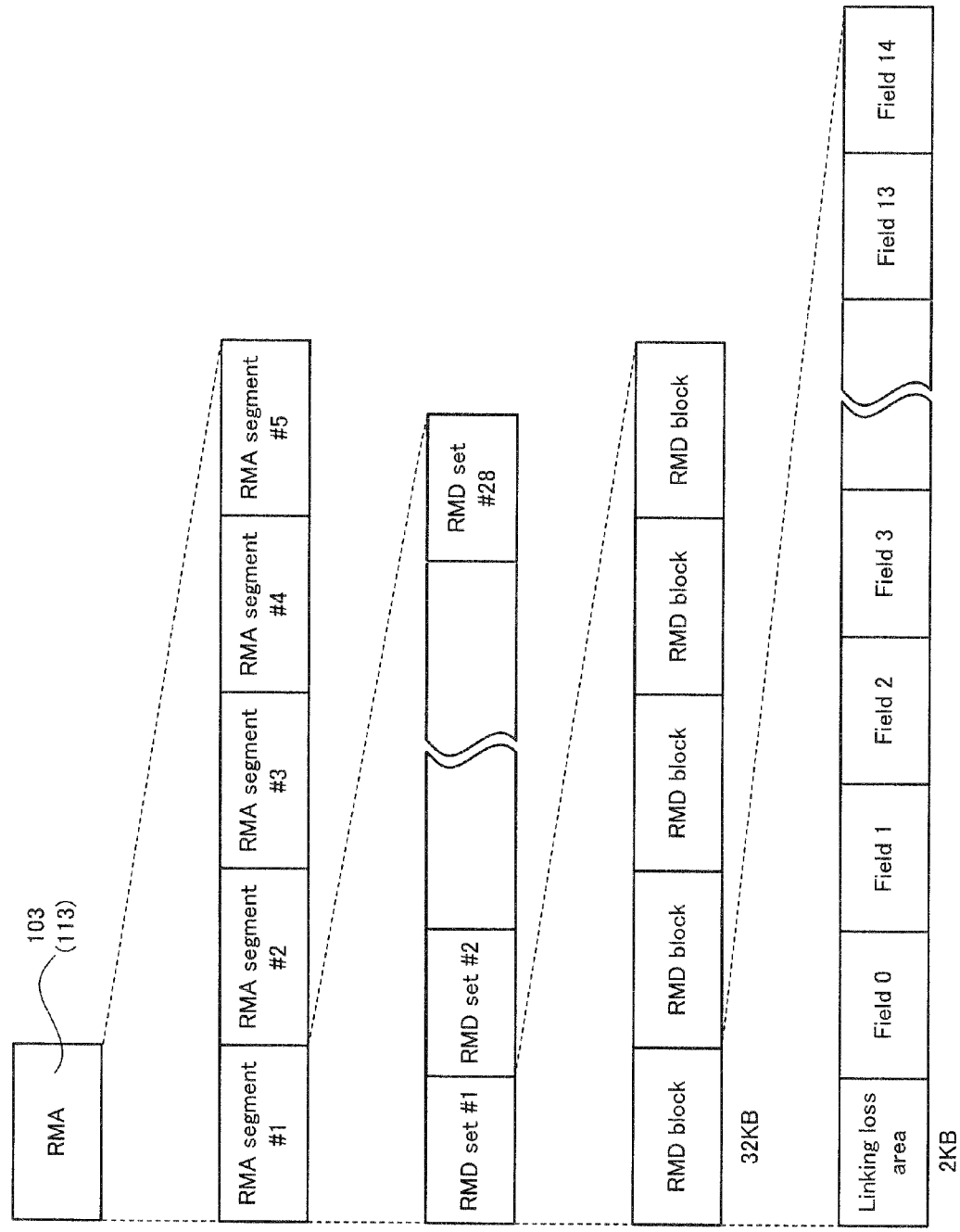

[FIG. 7]

| Sector NO. | Field NO. | Format 2 RMD | Format 3 RMD |
|---|---|---|---|
| 0 | Linking loss area | Linking loss area | |
| 1 | 0 | Common information | |
| 2 | 1 | Pointer to RMD set | OPC related information |
| 3 | 2 | | User specific data |
| 4 | 3 | | Recording status information |
| 5 | 4 | | |
| 6 | 5 | | |
| 7 | 6 | | |
| 8 | 7 | Reserved area | Defect status bitmap |
| 9 | 8 | | |
| 10 | 9 | | |
| 11 | 10 | | |
| 12 | 11 | | |
| 13 | 12 | | |
| 14 | 13 | | Drive specific information |
| 15 | 14 | | Disc testing area information |

[FIG. 8]

| BP | Content | Number of bytes |
|---|---|---|
| 0 | Format operation code | 1 byte |
| 1 | Reserved | 1 byte |
| 2 to 5 | Format information #1 | 4 bytes |
| 6 to 9 | Format information #2 | 4 bytes |
| 10 to 255 | Reserved | 54 bytes |
| 256 to 257 | Last Rzone number | 2 bytes |
| 258 to 261 | Start sector number of RZone | 4 bytes |
| 262 to 265 | End sector number of RZone | 4 bytes |
| 266 to 511 | Reserved | 4 bytes |
| 512 to 515 | Layer jump address of L0 layer | 4 bytes |
| 516 to 519 | Last recorded address | 4 bytes |
| 520 to 523 | Previous layer jump address of L0 layer | 4 bytes |
| 524 to 525 | Jump interval | 2 bytes |
| 526 to 527 | Reserved | 2 bytes |
| 528 to 531 | Outermost address of formatted area on L0 layer | 4 bytes |
| 532 to 535 | Outermost address of innermost-formatted area on L1 layer | 4 bytes |
| 536 to 539 | Outermost address of innermost-recorded area on L1 layer | 4 bytes |
| 540 to 2047 | Reserved | 1508 bytes |

[FIG. 9]
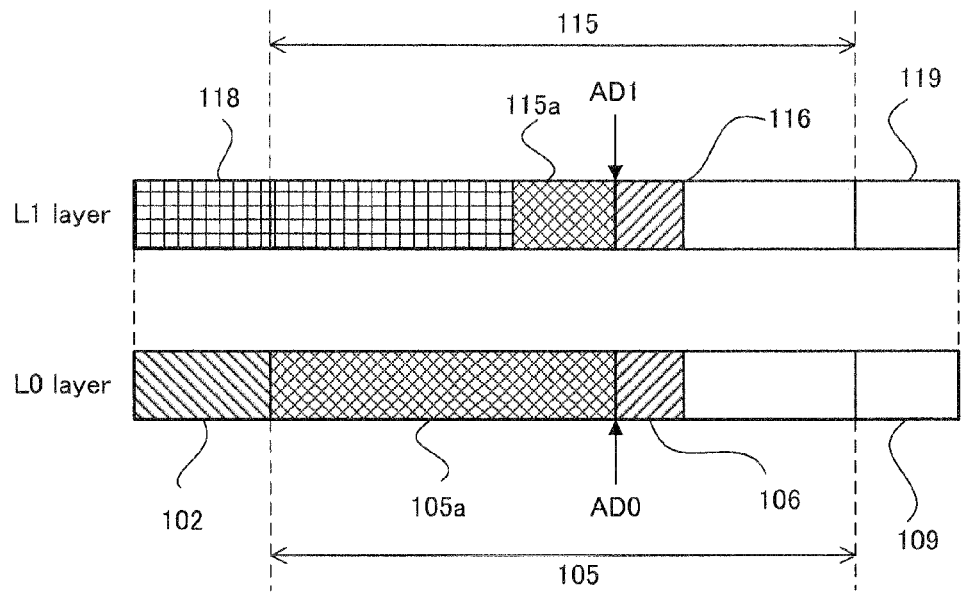
(a)
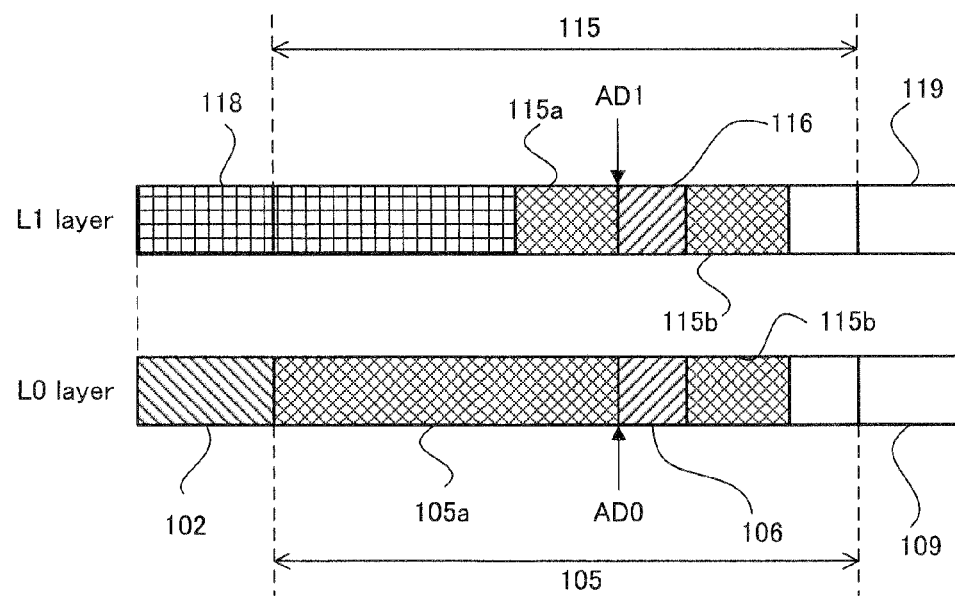
(b)

[FIG. 10]
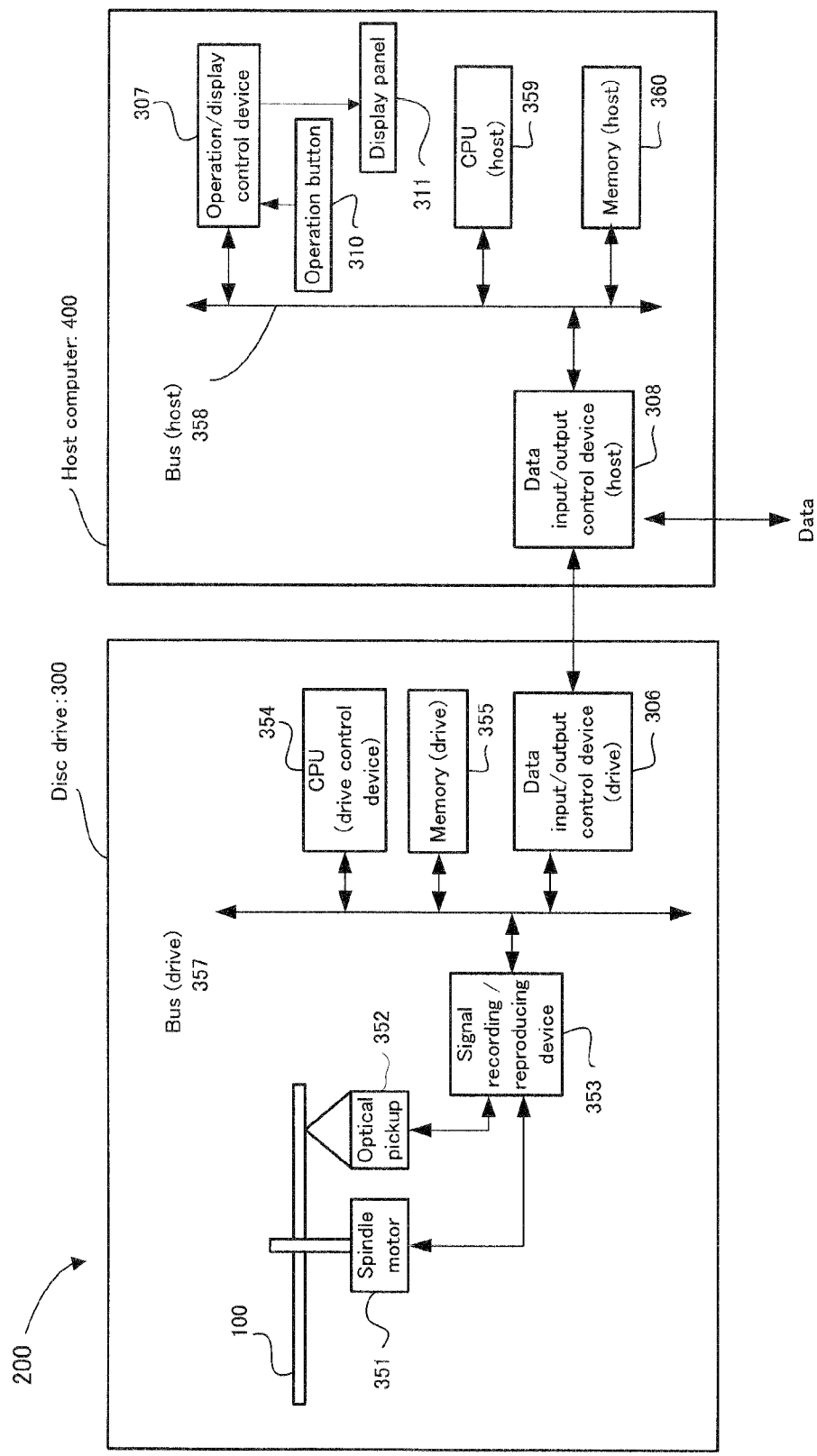

[FIG. 11]
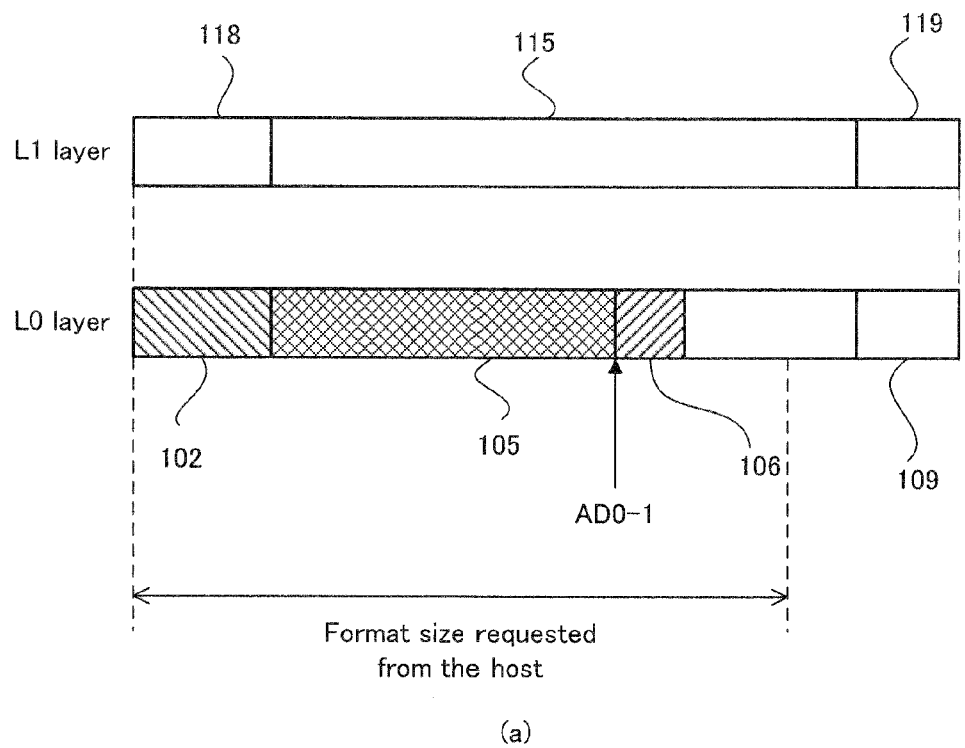
(a)
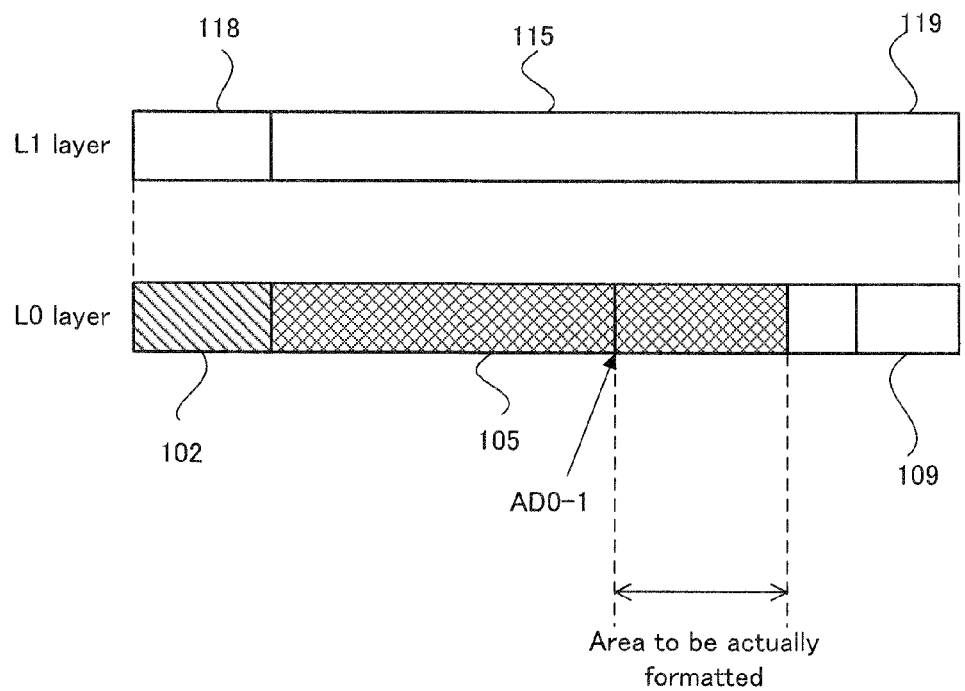
(b)

[FIG. 12]
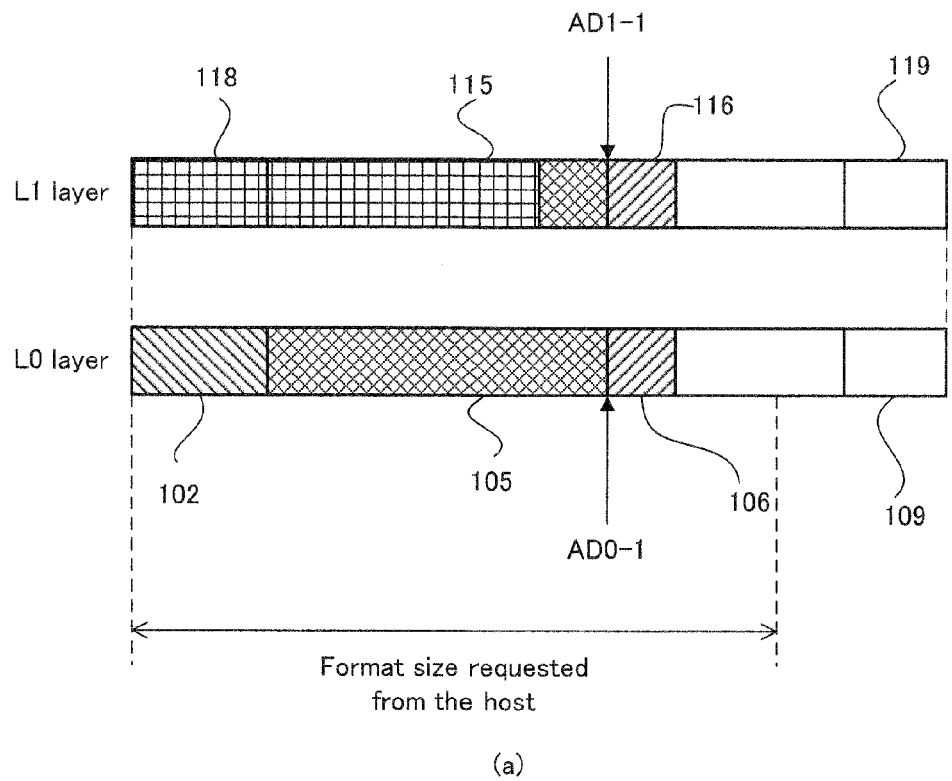
(a)
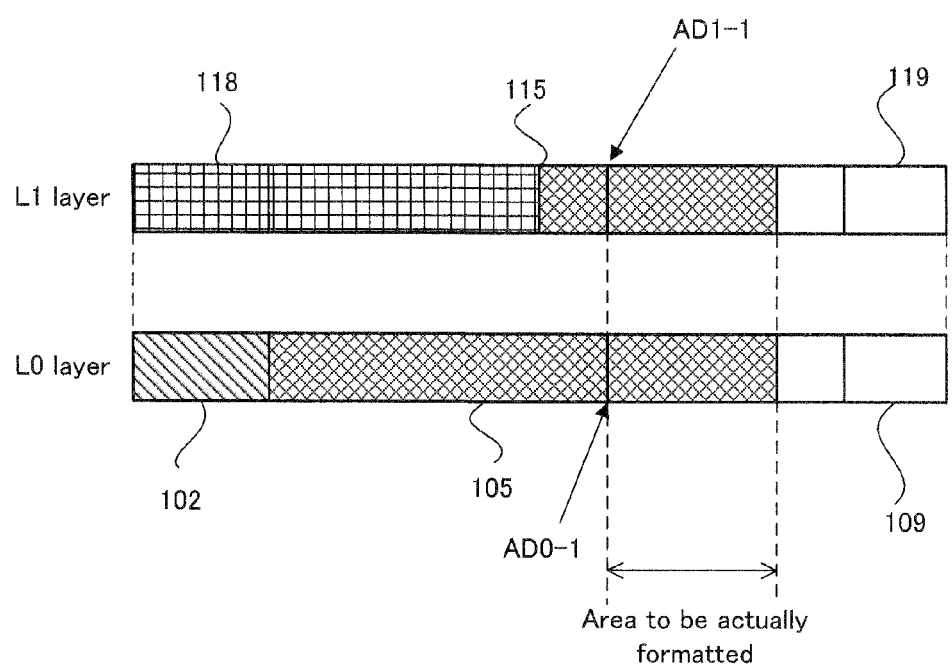
(b)

INFORMATION RECORDING MEDIUM, INFORMATION RECORDING APPARATUS AND METHOD, AND COMPUTER PROGRAM

TECHNICAL FIELD

The present invention relates to an information recording medium, such as a DVD, an information recording apparatus and method, such as a DVD recorder, and a computer program which makes a computer function as the information recording apparatus.

BACKGROUND ART

In an information recording medium, such as a DVD-ROM (DVD-Read Only Memory), a DVD-R (DVD-Recordable), and a BD-ROM, there is also developed a multilayer type or dual-layer type optical disc or the like on which a plurality of recording layers are laminated or bonded on a same substrate, as described in patent documents 1, 2 or the like. (Comment: a CD may have no dual-layer disc, so the DVD and the BD are exemplified.) Moreover, if recording is performed on the dual-layer type, i.e. two-layer type optical disc, e.g. a two-layer type DVD-R disc, an information recording apparatus, such as a DVD recorder, focuses a laser beam for recording on a recording layer located on the front side (i.e. on the closer side to an optical pickup) viewed from the irradiation side of the laser beam (referred to as a "L0 layer" as occasion demands in the application), to thereby record data into the L0 layer in a heat change recording method (in other words, an irreversible recording method), and it focuses the laser beam, through the L0 layer or the like, on a recording layer located on the rear side (i.e. on the farther side from the optical pickup) viewed from the irradiation side of the laser beam (referred to as a "L1 layer" as occasion demands in the application), to thereby record information into the L1 layer in the heat change recording method.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

In such a dual-layer type optical disc, a rewritable optical disc, such as a DVD-RW, has been developed. In the rewritable optical disc, a format process for making data recordable is performed, to thereby start the recording of the data. An area that is recorded by the format process can be overwritten with another data, randomly. In a normal format process (normal format), a lead-in area and a lead-out area are formed, and a middle area is formed following the recorded data. This can significantly conform the data structure of the rewritable optical disc, such as a DVD-RW, to the data structure of a read-only optical disc, such as a DVD-ROM.

Moreover, on the other hand, a quick format process is defined in the DVD-RW, in which minimum necessary management information is recorded. The quick-formatted DVD-RW disc allows sequential recording from the end edge portion of the recorded area. The sequential-recorded area can be also overwritten with another data, randomly.

Moreover, as a general rule, the recording area in which the data is once recorded or the format process is once performed never becomes the unrecorded recording area in which the data is not recorded at all (in other words, in which a record mark is not recorded). In the quick format, although it is possible to significantly reduce a format processing time by recording the minimum necessary management information, only one portion of the lead-in is recorded. Moreover, an area corresponding to the lead-out is not recorded, so that it cannot be read by a read-only device. Therefore, a finalize process described later is necessary in order that the read-only device performs the reading.

In recording media, such as a CD and a DVD, it is necessary to make a recording status in response to a user's request so that to the read-only device performs the reproduction on the disc. For example, in the disc of a CD-R or a DVD-R during additional recording, a finalize process is defined to make it reproducible by the read-only device, and the lead-in, lead-out, or border-out are recorded in response to the user's request so that an unrecorded area is not left in a range which is to be accessed by the read-only device. This is because there is such a problem that the read-only device cannot access the unrecorded portion of the recording media since a signal tracking method differs between a read-only medium and a recordable medium. In the quick-formatted recording medium, such as a DVD-RW, since only the minimum necessary data is recorded in the lead-in, it is necessary to completely record the lead-in, border-out, or lead-out by performing the aforementioned finalize process, in order to provide compatibility with the read-only device.

Moreover, in the dual-layer type recordable medium (optical disc), in order to provide the compatibility with the read-only device, the entire L1 layer, corresponding to the recorded L0 layer, needs to be recorded. This is because there should be no unrecorded portion on a displacement route of a pickup when the pickup jumps from a certain place on the L0 layer to a certain place on the L1 layer. In the dual-layer type recordable medium, layer jump recording in which the data is alternately recorded into the L0 layer and the L1 layer is mainly performed so that a data recording area can be disposed in the compatible status with the read-only device, i.e. so that the corresponding L1 layer becomes recorded-state, immediately when the request for the finalize process is given from the user. As a specific aspect of the layer jump recording, when a certain size of data is recorded, its half size of data is recorded into the L0 layer and the rest of half size of data is recorded into the L1 layer.

The layer jump recording is a method which is used when the sequential recording is performed on the quick-formatted disc, i.e. from the end edge portion of the recorded area. In case of such layer jump recording, the aforementioned finalize process (in other words, a compatible close process) needs to be performed in order to reproduce the data recorded by the layer jump recording on an information reproducing apparatus such as a ROM drive. As a result, the data recorded by the layer jump recording can be reproduced by the information reproducing apparatus such as a ROM drive.

Moreover, even after the normal format process is once performed, it is also possible to record the data again even into the middle area once formed and an area following the middle area, by performing the aforementioned quick format process on the middle area or the like.

However, if the data recording and the format process are repeated, the management information, which includes the disc status before the format process, is also initialized, i.e. deleted. Thus, it is hardly possible to clearly recognize, for example, which recording area on the optical disc is the recording area in which the data is already recorded, which recording area on the optical disc is the recording area in which the format process is already performed, which recording area on the optical disc is the middle area, or which recording area on the optical disc is the recording area in which the data has not been recorded yet, or the like.

On the other hand, in each sector on the disc, information indicating which area the sector belongs to is given. From this information, it is possible to judge which area of data area, lead-out, or middle area the sector belongs to. The recording area for data, in which the data is already recorded or the format process is already performed, is provided with the sector with a data area attribute. Therefore, for example, if the format process is performed on a desired recording area on the optical disc, the format process can be omitted in the recording area in which the data is already recorded or the format process is already performed. However, in the disc in which the format process and the recording are repeated as described above, since the information about the area in which the lead-out or middle area is recorded before is not maintained, the format process needs to be performed redundantly to record the data with the data area attribute. Thus, the format process unnecessarily requires a large amount of time.

In view of the aforementioned conventional problems, it is therefore an object of the present invention to provide an information recording medium, an information recording apparatus and method which allows an efficient format process, and a computer program which makes a computer function as the information recording apparatus.

Means for Solving the Subject

The above object of the present invention can be achieved by an information recording medium which can be rewritable provided with: a data recording area to which one attribute, which corresponds to recorded data, of a plurality of types of attributes is given in each of segmentized area units; and an address recording area to record therein an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

The above object of the present invention can be also achieved by a first information recording apparatus provided with: a first recording device for recording data onto an information recording medium which can be rewritable, while giving one attribute, which corresponds to the recorded data, of a plurality of types of attributes in each of segmentized area units; and a second recording device for recording, onto the information recording medium, an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

The above object of the present invention can be also achieved by a second information recording apparatus provided with: a first recording device for recording data onto an information recording medium which can be rewritable, while giving one attribute, which corresponds to the recorded data, of a plurality of types of attributes in each of segmentized area units; and a formatting device for performing a format process on the information recording medium, with reference to an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

The above object of the present invention can be also achieved by a first information recording method provided with: a first recording process of recording data onto an information recording medium which can be rewritable, while giving one attribute, which corresponds to the recorded data, of a plurality of types of attributes in each of segmentized area units; and a second recording process of recording, onto the information recording medium, an address of an edge portion on an outermost side of a recording area, which is a continuous recording are to which a data area attribute of the plurality of types of attributes is given and which is a recording area closest to an edge portion on an innermost side of the data recording area, the data area attribute indicating a status that user data is recorded as the data.

The above object of the present invention can be also achieved by a second information recording method provided with: a first recording process of recording data onto an information recording medium which can be rewritable, while giving one attribute, which corresponds to the recorded data, of a plurality of types of attributes in each of segmentized area units; and a formatting process of performing a format process on the information recording medium, with reference to an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

The above object of the present invention can be also achieved by a first computer program for recording control and for controlling a computer provided in the first information recording apparatus of the present invention described above, the computer program making the computer function as at least one portion of the first recording device and the second recording device.

The above object of the present invention can be also achieved by a second computer program for recording control and for controlling a computer provided in the second information recording apparatus of the present invention described above, the computer program making the computer function as at least one portion of the first recording device and the second formatting device.

These effects and other advantages of the present invention will become more apparent from the embodiments explained below.

BRIEF DESCRIPTION OF DRAWINGS

FIG. 1 are a substantial plan view showing the basic structure of an optical disc in an example, a schematic cross sectional view showing the optical disc, and its corresponding schematic conceptual view showing a recording area structure in the radial direction.

FIG. 2 is a schematic cross sectional view showing the optical disc, and its corresponding schematic conceptual view showing the recording area structure in the radial direction.

FIG. 3 are an explanatory view conceptually showing the data structure of an optical disc 100 after a normal format process is performed thereon and an explanatory view conceptually showing the data structure of an optical disc 100 after a quick format process is performed thereon.

FIG. 4 is a diagram conceptually showing transition of the status of the optical disc.

FIG. 5 is a data structure diagram conceptually showing a data structure related to an attribute given when data is recorded.

FIG. 6 is a data structure diagram conceptually showing the data structure of RMD to be recorded into a RMA.

FIG. 7 is a data structure diagram conceptually showing the data structure of each of fields which constitute the RMD, with regard to a format 2 and a format 3.

FIG. 8 is a data structure diagram conceptually showing the data structure of a field 3 of the RMD in the format 3.

FIG. 9 are explanatory views showing specific positions indicated by an outermost address of a formatted area on a L0 layer, which is recorded into an address recording area, and an outermost address of an innermost-formatted area on a L1 layer, which is recorded into an address recording area.

FIG. 10 is a block diagram conceptually showing the basic structure of an information recording/reproducing apparatus in an example.

FIG. 11 are explanatory views conceptually showing one data structure of the optical disc after the quick format process is performed thereon.

FIG. 12 are explanatory views conceptually showing another data structure of the optical disc after the quick format process is performed thereon.

DESCRIPTION OF REFERENCE CODES 100 optical disc
102 lead-in area
103, 113 RMA
105, 115 data area
106, 116 shifted middle area
109, 119 fixed middle area
118 lead-out area
1031, 1032 address recording area
200 information recording/reproducing apparatus
300 disc drive
352 optical pickup
353 signal recording/reproducing device
354 CPU
400 host computer

BEST MODE FOR CARRYING OUT THE INVENTION

Hereinafter, as the best mode for carrying out the invention, a description will be given on embodiments of the information recording medium, the information recording apparatus and method, and the computer program of the present invention.
(Embodiment of Information Recording Medium)

An embodiment of the information recording medium of the present invention is an information recording medium which can be rewritable provided with: a data recording area to which one attribute, which corresponds to recorded data, of a plurality of types of attributes is given in each of segmentized area units; and an address recording area to record therein an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data (e.g. content data, such as movie data, music data, and data for PC, which is distinguished from management information and control information necessary for the recording and reproduction of the user data) is recorded as the data.

According to the information recording medium of the present invention, the various data can be recorded into the data recording area provided for the information recording medium. When the data is recorded into the data recording area, the attribute corresponding to the data recorded in each area unit is given in each of the segmentized area units (e.g. in each of sectors described later).

Incidentally, the "data recording area" in the embodiment is mainly assumed to include a data area described later (moreover, including a shifted middle area and a middle area, which are formed in the data area).

In the embodiment, in particular, it is provided with the address recording area to record therein the address of the edge portion (in other words, the address of an end edge portion, and hereinafter referred to as an "end edge address" as occasion demands) on the outermost side of the recording area, which is the continuous recording area to which the data area attribute is given and which is the recording area closest to the edge portion on the innermost side of the data recording area (in other words, the innermost side of the information recording medium), wherein the data area attribute indicates the status that user data is recorded. That is, the address of the edge portion on the outermost side of the continuous recording area, in which there is no recording area to which another attribute except the data area attribute is given, is recorded into the address recording area. Incidentally, in the address recording area, the address may be directly recorded, or information which indirectly indicates the address may be recorded instead of the address itself.

In particular, even after the format process is performed on the information recording medium, the address of the edge portion on the outer circumferential side of the recording area, which is the continuous recording area to which the data area attribute is given and which is the recording area closest to the edge portion on the innermost side of the data recording area, is recorded, as long as there is the continuous recording are to which the data area attribute is given, on the information recording medium. More specifically, the address of the edge portion on the outermost side of the recording area, which is the continuous recording area to which the data area attribute is given and which is the recording area closest to the edge portion on the innermost side of the data recording area, is recorded, as long as the continuous recording area to which the data area attribute is given is physically present on the information recording medium, even after the data recorded on the information recording medium is logically deleted by performing the format process on the information recording medium. That is, the address of the edge portion on the outermost side of the recording area, which is the continuous recording area, physically existing on the information recording medium, to which the data area attribute is given, and which is the recording area closest to the edge portion on the innermost side of the data recording area, is recorded into the address recording area.

Since it is provided with the address recording area for recording the end edge address as described above, for example, it is possible to preferably recognize that the data to which the data area attribute is already given is recorded in the recording area on the inner circumferential side of the end edge address. Alternatively, for example, it is possible to preferably recognize that there is no recording area to which a middle area attribute is given, in the recording area on the inner circumferential side of the end edge address. Therefore, if the format process is performed on the certain recording area over the end edge address, it is only necessary to perform the format process on the recording area on the outer circumferential side of a position indicated by the end edge address. By this, it is unnecessary to perform the format process on the recording area on which the format process does not need to be performed, resulting in a reduction in the time required for the format process. That is, the efficient format process can be performed.

In one aspect of the embodiment of the information recording medium of the present invention, the address of the edge portion on the outermost side of the recording area which is the recording area closest to the edge portion on the innermost side of the data recording area, of a plurality of recording areas to each of which the data area attribute is given and each of which is the continuous recording area, is recorded into the address recording area.

According to this aspect, even if there is the plurality of continuous recording areas in which there is no recording area to which another attribute except the data area attribute is given, the address of the edge portion on the outermost side of the recording area which is the recording area closest to the edge portion on the innermost side of the data recording area, of the plurality of recording areas, is recorded into the address recording area. Between the recording area which is closest to the edge portion on the innermost side of the data recording area and the recording area other than the recording area which is closest to the edge portion on the innermost side of the data recording area, for example, there is a possibility that the recording area to which the middle area attribute is given exists. On the other hand, on the inner circumferential side of the recording area which is closest to the edge portion on the innermost side of the data recording area, there is little or no possibility that the recording area to which the middle area attribute is given exists. Therefore, if the format process is performed on the certain recording area over the end edge address, it is only necessary to perform the format process on the recording area on the outer circumferential side of the position indicated by the end edge address. By this, it is unnecessary to perform the format process on the recording area on which the format process does not need to be performed, resulting in a reduction in the time required for the format process. That is, the efficient format process can be performed.

In another aspect of the embodiment of the information recording medium of the present invention, it is provided with a first recording layer and a second recording layer, each of which comprises at least the data recording area, and at least one of which comprises the address recording area.

According to this aspect, even in the information recording medium provided with the plurality of recording layers which are laminated, the aforementioned various benefits can be received.

In an aspect of the information recording medium provided with the first recording layer and the second recording layer, as described above, each of (i) the address of the edge portion on the outermost side of the recording area, which is the continuous recording area to which the data area attribute is given and which is a recording area closest to the edge portion on the innermost side of the data recording area in the first recording layer and (ii) the address of the edge portion on the outermost side of the recording area, which is the continuous recording area to which the data area attribute is given and which is a recording area closest to the edge portion on the innermost side of the data recording area in the second recording layer, may be recorded into the address recording area.

By virtue of such construction, with respect to each of the first recording layer and the second recording layer, the time required for the format process can be reduced as described above, and the efficient format process can be performed.

In an aspect of the information recording medium provided with the first recording layer and the second recording layer, as described above, an address in the first recording layer may increase from an inner circumferential side toward an outer circumferential side, an address in the second recording layer may decrease from the inner circumferential side toward the outer circumferential side, and each of (i) a largest address of the recording area, which is the continuous recording area to which the data area attribute is given and which is a recording area closest to the edge portion on the innermost side of the data recording area in the first recording layer and (ii) a smallest address of the recording area, which is the continuous recording area to which the data area attribute given thereto and which is a recording area closest to the edge portion on the innermost side of the data recording area in the second recording layer, may be recorded into the address recording area.

By virtue of such construction, with respect to each of the first recording layer and the second recording layer, in which an opposite track path method is adopted, the time required for the format process can be reduced as described above, and the efficient format process can be performed.

In another aspect of the embodiment of the information recording medium of the present invention, the plurality of types of attributes include at least one of a lead-in area attribute, a lead-out attribute, the data area attribute, and a middle area attribute.

According to this aspect, it is possible to preferably identity the attribute of the recording area on the information recording medium.

In another aspect of the embodiment of the information recording medium of the present invention, it is further provided with a management data recording area to record therein management data for managing at least one of recording and reproduction of the data recorded in the data recording area, the address recording area being located in the management data recording area.

According to this aspect, it is possible to preferably provide the address recording area on the information recording medium.

(Embodiments of Information Recording Apparatus)

A first embodiment of the information recording apparatus of the present invention is an information recording apparatus provided with: a first recording device for recording data onto an information recording medium which can be rewritable, while giving one attribute, which corresponds to the recorded data, of a plurality of types of attributes in each of segmentized area units; and a second recording device for recording, onto the information recording medium, an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

According to the first embodiment of the information recording apparatus of the present invention, by the operation of the first recording device, the various data can be recorded onto the information recording medium. When the data is recorded into the data recording area, the attribute corresponding to the data recorded in each area unit is given in each of the segmentized area units (e.g. in each of sectors described later).

In the first embodiment, in particular, by the operation of the second recording device, the address of the edge portion on the outermost side of the recording area, which is the continuous recording area to which the data area attribute is given and which is the recording area closest to the edge portion on the innermost side of the data recording area, is recorded onto the information recording medium, wherein the data area attribute indicates the status that the user data is recorded. Thus, as in the embodiment of the information recording medium of the present invention described above, if the format process is performed on the certain recording area over the end edge address, it is only necessary to perform the format process on the recording area on the outer circumferential side of a position indicated by the end edge address. By this, it is unnecessary to perform the format process on the recording area on which the format process does not need to be performed, resulting in a reduction in the time required for the format process. That is, the efficient format process can be performed.

Incidentally, in response to the various aspects in the embodiment of the information recording medium of the present invention described above, the first embodiment of the information recording apparatus of the present invention can also adopt various aspects.

In one aspect of the first embodiment of the information recording apparatus of the present invention, the first recording device records the data into a data recording area of the information recording medium, while giving the one attribute, which corresponds to the recorded data, of the plurality of types of attributes in each of the segmentized area units, and the second recording device records, into an address recording area of the information recording medium, the address of the edge portion on the outermost side of the recording area, which is the continuous recording area to which the data area attribute is given and which is the recording area closest to the edge portion on the innermost side of the data recording area.

According to this aspect, it is possible to preferably perform the recording operation on the embodiment of the information recording medium of the present invention described above, and it is also possible to receive the aforementioned various benefits.

In another aspect of the first embodiment of the information recording apparatus of the present invention, the information recording medium comprises a first recording layer and a second recording layer, each of which comprises at least the data recording area and at least one of which comprises the address recording area, and the second recording device records each of (i) the address of the edge portion on the outermost side of the recording area, which is the continuous recording area to which the data area attribute is given and which is a recording area closest to the edge portion on the innermost side of the information recording medium in the first recording layer and (ii) the address of the edge portion on the outermost side of the recording area, which is the continuous recording area to which the data area attribute is given and which is a recording area closest to the edge portion on the innermost side of the information recording medium in the second recording layer.

According to this aspect, even in the information recording medium provided with the plurality of recording layers laminated, the aforementioned various benefits can be received.

In another aspect of the first embodiment of the information recording apparatus of the present invention, it is further provided with: a formatting device for performing a format process on a desired recording area of the information recording medium; and a controlling device for controlling the formatting device to start the format process toward an outer circumferential side from the edge portion on the outermost side of the recording area, which is the continuous recording area to which the data area attribute is given and which is the recording area closest to the edge portion on the innermost side of the information recording medium, if the format process is performed on a recording area having a start edge portion on an inner circumferential side of and an end edge portion on an outer circumferential side of the edge portion on the outermost side of the recording area, which is the continuous recording area to which the data area attribute is given and which is the recording area closest to the edge portion on the innermost of the information recording medium.

According to this aspect, by the operation of the controlling device, if the format process is performed on the certain recording area over the end edge address, it is only necessary to perform the format process on the recording area on the outer circumferential side of a position indicated by the end edge address. By this, it is unnecessary to perform the format process on the recording area on which the format process does not need to be performed, resulting in a reduction in the time required for the format process. That is, the efficient format process can be performed.

A second embodiment of the information recording apparatus of the present invention is an information recording apparatus provided with: a first recording device for recording data onto an information recording medium which can be rewritable, while giving one attribute, which corresponds to the recorded data, of a plurality of types of attributes in each of segmentized area units; and a formatting device for performing a format process on the information recording medium, with reference to an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

According to the second embodiment of the information recording apparatus of the present invention, by the operation of the first recording device, the various data can be recorded onto the information recording medium. When the data is recorded into the data recording area, the attribute corresponding to the data recorded in each area unit is given in each of the segmentized area units (e.g. in each of sectors described later).

In the second embodiment, in particular, by the operation of the formatting device, the format process is performed on the information recording medium, with reference to the address of the edge portion on the outermost side of the recording area, which is the continuous recording area to which the data area attribute is given and which is the recording area closest to the edge portion on the innermost side of the data recording area, wherein the data area attribute indicates the status that the user data is recorded, Thus, as in the embodiment of the information recording medium of the present invention described above, if the format process is performed on the certain recording area over the end edge address, it is only necessary to perform the format process on the recording area on the outer circumferential side of a position indicated by the end edge address. By this, it is unnecessary to perform the format process on the recording area on which the format process does not need to be performed, resulting in a reduction in the time required for the format process. That is, the efficient format process can be performed.

Incidentally, in response to the various aspects in the embodiment of the information recording medium of the present invention described above, the second embodiment of the information recording apparatus of the present invention can also adopt various aspects.

(Embodiments of Information Recording Method)

A first embodiment of the information recording method of the present invention is an information recording method provided with: a first recording process of recording data onto an information recording medium which can be rewritable, while giving one attribute, which corresponds to the recorded data, of a plurality of types of attributes in each of segmentized area units; and a second recording process of recording, onto the information recording medium, an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

According to the first embodiment of the information recording method of the present invention, it is possible to receive the same various benefits as those of the first embodiment of the information recording apparatus of the present invention.

Incidentally, in response to the various aspects of the first embodiment of the aforementioned information recording apparatus of the present invention, the first embodiment of the information recording method of the present invention can employ various aspects.

A second embodiment of the information recording method of the present invention is n information recording method provided with: a first recording process of recording data onto an information recording medium which can be rewritable, while giving one attribute, which corresponds to the recorded data, of a plurality of types of attributes in each of segmentized area units; and a formatting process of performing a format process on the information recording medium, with reference to an address of an edge portion on an outermost side of a recording area, which is a continuous recording area to which a data area attribute of the plurality of types of attributes is given and which is a recording area closest to an edge portion on an innermost side of the data recording area, the data area attribute indicating a status that user data is recorded as the data.

According to the second embodiment of the information recording method of the present invention, it is possible to receive the same various benefits as those of the second embodiment of the information recording apparatus of the present invention.

Incidentally, in response to the various aspects of the second embodiment of the aforementioned information recording apparatus of the present invention, the second embodiment of the information recording method of the present invention can employ various aspects.

(Embodiments of Computer Program)

A first embodiment of the computer program of the present invention is a computer program for recording control and for controlling a computer provided in the aforementioned first embodiment of the information recording apparatus of the present invention (including its various aspects), the computer program making the computer function as at least one portion of the first recording device and the second recording device.

According to the first embodiment of the computer program of the present invention, the aforementioned first embodiment of the information recording apparatus of the present invention (including its various aspects) can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned first embodiment of the information recording apparatus of the present invention, the first embodiment of the computer program of the present invention can also employ various aspects.

A second embodiment of the computer program of the present invention is a computer program for recording control and for controlling a computer provided in the aforementioned second embodiment of the information recording apparatus of the present invention (including its various aspects), the computer program making the computer function as at least one portion of the first recording device and the formatting device.

According to the second embodiment of the computer program of the present invention, the aforementioned second embodiment of the information recording apparatus of the present invention (including its various aspects) can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned second embodiment of the information recording apparatus of the present invention, the second embodiment of the computer program of the present invention can also employ various aspects.

The above object of the present invention can be also achieved by a first embodiment of a computer program product in a computer-readable medium for tangibly embodying a program of instructions executable by a computer provided in the aforementioned first embodiment of the information recording apparatus of the present invention (including its various aspects), the computer program product making the computer function as at least one portion of the first recording device and the second recording device.

According to the first embodiment of the computer program product of the present invention, the aforementioned first embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned first embodiment of the information recording apparatus of the present invention.

Incidentally, in response to the various aspects of the aforementioned first embodiment of the information recording apparatus of the present invention, the first embodiment of the computer program product of the present invention can also employ various aspects.

The above object of the present invention can be also achieved by a second embodiment of a computer program product in a computer-readable medium for tangibly embodying a program of instructions executable by a computer provided in the aforementioned second embodiment of the information recording apparatus of the present invention (including its various aspects), the computer program product making the computer function as at least one portion of the first recording device and the formatting device.

According to the second embodiment of the computer program product of the present invention, the aforementioned second embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned second embodiment of the information recording apparatus of the present invention.

Incidentally, in response to the various aspects of the aforementioned second embodiment of the information recording apparatus of the present invention, the second embodiment of the computer program product of the present invention can also employ various aspects.

These effects and other advantages of the present invention will become more apparent from the example explained below.

As explained above, according to the embodiment of the information recording medium of the present invention, it is provided with the data recording area and the address recording area. According to the embodiment of the information recording apparatus of the present invention, it is provided with the first recording device and the second recording device. According to the embodiment of the information recording method of the present invention, it is provided with the first recording process and the second recording process. According to the embodiment of the computer program of the present invention, it makes a computer function as one portion of the first recording device and the second recording device. Therefore, the efficient format process can be performed.

EXAMPLE

Examples of the present invention will be explained on the basis of the drawings.

Firstly, with reference to FIG. 1, a description will be given on an optical disc 100 as an example of the information recording medium of the present invention. FIG. 1(a) is a substantial plan view showing the basic structure of the optical disc 100, and FIG. 1(b) is a schematic cross sectional view of the optical disc and its corresponding schematic conceptual view showing a recording area structure in the radial direction.

As shown in FIG. 1(a) and FIG. 1(b), the optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 115; and fixed middle areas 109 and 119. Then, in the optical disc 100, recording layers or the like are laminated on a transparent substrate 110, for example. In each recording area of the recording layers, a track or tracks, such as groove tracks and land tracks, are alternately placed, spirally or concentrically, centered on the center hole 101. Moreover, on the track, data is divided and recorded by a unit of ECC block. The ECC block is a data management unit in which the record information can be error-corrected.

Incidentally, the present invention is not particularly limited to the optical disc having the three areas, as described above. For example, even if the lead-in area 102, the lead-out area 118 or the fixed middle areas 109 and 119 do not exist, a data structure and the like explained below can be constructed. Moreover, as described later, the lead-in area 102, the lead-out area 118 or the fixed middle areas 109 and 119 may be further segmentized.

In particular, the optical disc 100 in the example, as shown in FIG. 1(b), has such a structure that an L0 layer and an L1 layer, which constitute one example of the first and second recording layers of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of a laser beam LB, irradiated from the lower side to the upper side in FIG. 1(b). In particular, in the L0 layer, the data is recorded from the inner circumferential side to the outer circumferential side, while in the L1 layer, the data is recorded from the outer circumferential side to the inner circumferential side. In other words, the optical disc 100 in the example corresponds to an optical disc of an opposite track path type. However, even an optical disc of a parallel track path type can also receive various benefits described later, by adopting a structure discussed below.

Moreover, in the optical disc 100 in the example, layer jump recording is adopted in which data is recorded alternately into the L0 layer and the L1 layer. Specifically explaining the layer jump recording, the data is recorded into a partial recording area in the L0 layer before the data is recorded into a partial recording area in the L1 layer that faces the partial recording area in the L0 layer. After that, the data is recorded into another partial recording area in the L0 layer before the data is recorded into another partial recording area in the L1 layer that faces the another partial recording area in the L0 layer. This operation is repeated subsequently.

Moreover, the optical disc 100 in the example is provided with recording management areas (RMA) 103 and 113 on the inner circumferential side of the lead-in area 102 and the lead-out area 118, respectively.

The RMA 103 and 113 are recording areas to record therein RMD (Recording Management Data) for managing the data recording onto the optical disc 100. The more specific data structure of the RMD will be detailed later (refer to FIG. 6 to FIG. 8).

Moreover, the optical disc 100 in the example is not limited to a dual-layer, single-sided type, i.e., a dual layer type, but may be a dual-layer, double-sided type. Furthermore, the optical disc 100 in the example is not limited to the optical disc having the two recording layers, as described above, but may be an optical disc of a multilayer type which has three or more layers.

Incidentally, the fixed middle area 109 and 119 are formed to provide the compatibility between a read-only optical disc, such as a DVD-ROM, and the optical disc 100 in the example after the data is recorded into all the data areas 105 and 115. That is, the fixed middle area 109 and 119 are formed to conform an area structure on the optical disc 100 in the example to an area structure on the dual-layer type read-only optical disc. In addition, the fixed middle area 109 and 119 have a function of preventing an optical pickup from jumping into an unrecorded area (specifically the outer circumferential side of the fixed middle area 109 and 119) when the layer jump is performed to change the recording layer or when near the fixed middle area 109 and 119 are accessed, after the data is recorded in all the data areas 105 and 115. If the data is recorded only in one portion of the data areas 105 and 115, shifted middle areas 106 and 116 are used instead of the fixed middle area 105 and 115.

Now, with reference to FIG. 2, the shifted middle areas 106 and 116 will be explained. FIG. 2 is a schematic cross sectional view showing the optical disc 100, and its corresponding schematic conceptual view showing the recording area structure in the radial direction.

As shown in FIG. 2, the shifted middle area 106 is disposed in the data area 105, following the data recorded in one portion of the data area 105. In the same manner, the shifted middle area 116 is disposed in the data area 115, following the data recorded in one portion of the data area 115.

The disposing of the shifted middle areas 106 and 116 allows the compatibility between the read-only optical disc, such as a DVD-ROM, and the optical disc 100 in the example even if the data is recorded only in one portion of the data areas 105 and 115. In addition, the disposing can prevent the optical pickup from jumping into the unrecorded area when the layer jump is performed. Moreover, even when the layer jump is not performed, it is possible to prevent the optical pickup from jumping into an unrecorded area that is located on the outer circumferential side of the shifted middle areas 106 and 116. Thus, a read-only type information reproducing apparatus can reproduce the data recorded on the optical disc 100.

That is, the shifted middle areas 106 and 116 have both a function of maintaining the compatibility with the read-only type optical disc and a function of preventing the jump of the optical pickup, in the case that the data is recorded only in one portion of the data areas 105 and 115. In particular, in the case of layer jump recording, the data is recorded only in one portion of the data areas 105 and 115 in most cases. Therefore, the shifted middle areas 106 and 116 are effectively used particularly in the layer jump recording.

On the other hand, the fixed middle areas 109 and 119 have both a function of maintaining the compatibility with the read-only type optical disc and a function of preventing the jump of the optical pickup, in the case that the data is recorded in all the data areas 105 and 115.

In the lead-in area 102, the lead-out area 118, the fixed middle areas 109 and 119, and the shifted middle areas 106 and 116, predetermined data (e.g. various control data, padding data, such as "00h", or the like) is recorded by performing a normal format process on the optical disc 100. Moreover, a quick format process for recording only minimum necessary management information to start the data recording is also performed on the optical disc 100, in addition to the normal format process.

Now, with reference to FIG. 3 and FIG. 4, the normal format process and the quick format process are specifically explained. FIG. 3 are an explanatory view conceptually showing the data structure of the optical disc 100 after the normal format process is performed thereon (FIG. 3(a)) and an explanatory view conceptually showing the data structure of the optical disc 100 after the quick format process is performed thereon (FIG. 3(b)). FIG. 4 is a diagram conceptually showing transition of the status of the optical disc 100.

As shown in FIG. 3(a), if the normal format process is performed, the predetermined data is recorded into the lead-in area 102 while a lead-in area attribute is given, and the predetermined data is recorded into the lead-out area 118 while a lead-out area attribute is given.

Moreover, the shifted middle area 106 is formed by recording the predetermined data into a recording area following the data recorded in the data area 105 while a middle area attribute is given, and the shifted middle area 116 is formed by recording the predetermined data into a recording area following the data recorded in the data area 115 while a middle area attribute is given. Alternatively, in accordance with a format size requested from a host computer or the like described later, the predetermined data is recorded into the data areas 105 and 115 while a data area attribute is given, and the shifted middle areas 106 and 116 may be formed following the recorded data.

By performing the normal format process as described above, it is possible to substantially conform the area structure on the optical disc 100 to the area structure on the read-only type optical disc. The status of the optical disc 100 shown in FIG. 3(a) is referred to as a "complete status".

On the other hand, as shown in FIG. 3(b), if the quick format process is performed, minimum necessary data is recorded into the lead-in area 102 while a data area attribute is given. Moreover, in accordance with the format size requested from the host computer or the like described later, the predetermined data is recorded into the data areas 105 and 115, if necessary, while a data area attribute is given, and an intermediate lead-out area 108 with a size of 32ECC blocks is formed following the recorded data. In the intermediate lead-out area 108, the predetermined data is recorded, if necessary, while a lead-out attribute is given. The status of the optical disc 100 shown in FIG. 3(b) is referred to as an "intermediate status".

By performing the quick format process as described above, it is possible to record the data into a partial recording area of the data area 105 to which the data area attribute is given. More specifically, in a recording area in which no data is recorded (in other words, a recording area to which no attribute is given), it is necessary to record the data sequentially (in other words, continuously from the inner circumferential side to the outer circumferential side). That is, since a NWA (Next Writable Address), which indicates a recording area in which the data can be recorded next, indicates a head portion of the recording area in which the data is not recorded, it is necessary to record the data in order (i.e. sequentially) from the recording area indicated by the NWA, in a recording area on the outer circumferential side of the NWA. However, in a recording area which is located on the inner circumferential side of the position indicated by the NWA and to which the data area attribute is given, it is possible to record the data at a desired position (i.e. randomly). As described above, the quick format process also has a function of updating the NWA to thereby enlarge the recording area in which the data can be recorded.

Moreover, in the quick-formatted optical disc 100, as opposed to the case that the normal format process is performed, all the necessary data is not recorded in the lead-in area 102, the lead-out area 118, or the like. Therefore, the various management information or various control information corresponding to an aspect of recording the data on the optical disc 100 is recorded into the lead-in area 102, the lead-out area 118, or the like by further performing a finalize process after the quick format process. Moreover, the shifted middle areas 106 and 116 and the fixed middle areas 109 and 119 are formed following the recorded data, and padding data, such as "00 h" data, is recorded into an unrecorded area between the lead-in area 102 and the shifted middle area 106 (or the fixed middle area 109) and an unrecorded area between the lead-out area 118 and the shifted middle area 116 (or the fixed middle area 119). By this, it is possible to perform the reproduction on the optical disc 100 in the example, on the read-only type information reproducing apparatus.

Incidentally, the size of the data recorded in the L0 layer and the size of the data recorded in the L1 layer are not the same in some cases, depending on the size of the data recorded into the optical disc 100. Specifically, there is such a case that xGB data is recorded from the inner circumferential side to the outer circumferential side in the L0 layer, then the layer jump is performed, and then x/2MB data is recorded from the outer circumferential side to the inner circumferential side in the L1 layer. In this case, there is the recording area, which corresponds to the recording area in the L0 layer in which the data is already recorded, in which the data is not recorded in the L1 layer. On the other hand, from the viewpoint of stable data reproduction, some data needs to be recorded (in other words, it is not in a mirror status) in the recording area in the L1 layer facing the recording area in the L0 layer in which the data is already recorded. Therefore, in the recording area in the L1 layer in which the data is not recorded and which faces the recording area in the L0 layer in which the data is already recorded, it is necessary to record the predetermined data while a data area attribute is given. Alternatively, in the recording area in the L1 layer in which the data is not recorded and which faces the recording area in the L0 layer in which the data is already recorded, it may be constructed to record the predetermined data (i.e. padding data or the like) while a lead-out area attribute is given.

Moreover, if the quick format process, in which the predetermined data is recorded into the shifted middle areas 106 and 116 or the like while a data area attribute is given, is performed on the optical disc 100 in the complete status shown in FIG. 3(*a*), it is possible to record the data again onto the optical disc 100 which once becomes in the complete status. As described above, the quick format process performed to record the data again onto the optical disc 100 in the complete status can be referred to as a quick grow format process.

As shown in FIG. 4, the status of the optical disc 100 can be transited into the complete status shown in FIG. 3(*a*) by performing the normal format process on the blank optical disc 100 on which the data is not recorded. In the same manner, the status of the optical disc 100 can be transited into the intermediate status shown in FIG. 3(*b*) by performing the quick format process on the new optical disc 100.

The status of the optical disc 100 can be maintained in the complete status shown in FIG. 3(*a*) by performing the normal format process on the optical disc 100 transited into the complete status. Moreover, the status of the optical disc 100 can be transited into the intermediate status shown in FIG. 3(*b*) by performing the quick format process (in other words, quick grow format process) on the optical disc 100 transited into the complete status.

The status of the optical disc 100 can be maintained in the intermediate status shown in FIG. 3(*b*) by performing the quick format process on the optical disc 100 transited into the intermediate status. Moreover, the status of the optical disc 100 can be transited into the complete status shown in FIG. 3(*a*) by performing the normal format process on the optical disc 100 transited into the intermediate status.

Next, with reference to FIG. 5, a specific description will be given on the attribute given when the data is recorded. FIG. 5 is a data structure diagram conceptually showing the data structure related to the attribute given when data is recorded.

The attribute is given for each physical sector with a size of 2418 bytes, in accordance with the data recorded in the physical sector. One physical sector is provided with: a SYNC code with a size of 52 bytes; an ECC (Error Correction Code) with a size of 302 bytes; user data with a size of 2048 bytes; a data ID with a size of 4 bytes; an IED with a size of 2 bytes; CPR_MAI with a size of 6 bytes; and an EDC with a size of 4 bytes. Then, the attribute is recorded in the data ID.

Specifically, as shown in FIG. 5, the data ID with a size of 4 bytes includes sector information with a size of 1 byte and a sector number with a size of 3 bytes.

The sector information with a size of 1 byte includes: a sector format type with a size of 1 bit; a tracking method with a size of 1 bit; reflectivity with a size of 1 bit; a reserved area with a size of 1 bit; an area type with a size of 2 bits indicating the attribute; a data type with a size of 1 bit; and a layer number with a size of 1 bit.

The area type indicates the attribute of the physical sector including the area type. Specifically, for example, if "00b" is recorded, it indicates that the physical sector is the data area attribute. If "01b" is recorded, it indicates that the physical sector is the lead-in area attribute. If "10b" is recorded, it indicates that the physical sector is the lead-out area attribute. If "11b" is recorded, it indicates that the physical sector is the middle area attribute.

Next, with reference to FIG. 6 to FIG. 8, a description will be given on the specific data structure of the RMD to be recorded into the RMA 103 and 113. FIG. 6 is a data structure diagram conceptually showing the data structure of the RMD to be recorded into the RMA 103 and 113. FIG. 7 is a data structure diagram conceptually showing the data structure of each of fields which constitute the RMD, with regard to a format 2 and a format 3. FIG. 8 is a data structure diagram conceptually showing the data structure of a field 3 of the RMD in the format 3. Incidentally, in the following explanation, the RMA 103 will be explained for simplification of explanation; however, obviously the RMA 113 may also have the same data structure.

As shown in FIG. 6, a recording area obtained by combining the RMA 103 and the RMA 113 is divided into five RMA segments (#1 to #5). Into each of the RMA segments (#1 to #5), 28 RMD sets (#1 to #28) can be recorded. Into each of the RMD sets (#1 to #28), five RMD blocks each having a size of 32 KB can be recorded. The five RMD blocks recorded in each of the RMD sets (#1 to #28) have the same content, except one portion of field. In other words, the five RMD blocks indicating the same content are redundantly recorded into one RMD set. Each RMD block includes: a linking loss area with a size of 2 KB; and 15 fields (0 to 14) each of which has a size of 2 KB.

As shown in FIG. 7, in the optical disc 100 in the example, format 2 RMD and format 3 RMD are recorded into the RMA 103. The format 2 RMD has a function of a pointer which indicates the position of the format 3 RMD that is valid (in other words, latest), and the format 3 RMD actually includes information for managing the data recording on the optical disc 100.

Specifically, as shown in FIG. 8, the format 2 RMD includes a linking loss area, common information, a pointer to the RMD set, and a reserved area.

The format 3 RMD includes a linking loss area, common information, OPC (Optimum Power Control) related information, user specific data, recording status information, a defect status bitmap, drive specific information, and disc testing area information.

The format 2 RMD is recorded into the RMD set #1 located at the head of each RMA segment in order to indicate the valid format 3RMD, by using the pointer to the RMD set. The format 3 RMD is recorded into the RMD sets (#2 to #28) other than the RMD set #1 located at the head of each RMA segment.

Specifically, for example, if the normal format process or quick format process is performed on the blank optical disc 100, the format 3 RMD is recorded into the RMD set #2 (or the RMD sets #3 to #28) other than the RMD set #1 at the head of the RMA segment #1. Then, the format 2 RMD for pointing the position into which the format 3RMD is recorded is recorded into the RMD set #1 at the head of the RMA segment #1.

As the data recording progresses in the data areas 105 and 115, the format 3 RMD is updated. The same RMD set #2 is overwritten with the format 3 RMD in each time of updating or in predetermined timing. After the overwriting is performed many times, a reading error starts to occur because of the overwriting beyond the upper limit of the number of writing times or because of scratches and dust, or the like. Then, if the format 3 RMD cannot be read in a plurality of RMD blocks of the five RDM blocks included in the RMD set #2, the format 3 RMD is newly recorded into the RMD set #3 other than the RMD set #2. In this case, the format 2 RMD is also updated in accordance with the change in the position into which the format 3 RMD is recorded, and it is written over the RMD set #1. After this, such an operation is performed on the RMD sets #3 to #28. Then, if it is judged that the format 3 RMD cannot be read in all the RMD sets of the RMA segment #1, the format 3 RMD is newly recorded into the RMD set #2 of the RMA segment #2, and the format 2 RMD is newly recorded into the RMD set #1 of the RMA segment #2. After this, such an operation is performed on the RMA segments #2 to #5.

Moreover, if the format 2 RMD cannot be read in a plurality of RMD blocks of the five RDM blocks included in the RMD set #1 of the RMA segment #1, the format 2 RMD and the format 3 RMD are recorded by using the RMA segment #2. In this case, even if the format 3 RMD can be read from any of the RMD sets #2 to #28 of the RMA segment #1, the format 2 RMD and the format 3 RMD are recorded by using the next RMA segment #2.

Then, as shown in FIG. 8, the recording status information recorded in the field 3 in the format 3 RMD includes: a format operation code in a byte position of "0"; format information #1 in a byte position "2 to 5"; format information #2 in a byte position of "6 to 9"; a last RZone number in a byte position of "256 to 257"; a start sector number of RZone in a byte position of "258 to 261"; an end sector number of RZone in a byte position of "262 to 265"; a layer jump address on the L0 layer in a byte position of "512 to 515"; a last recorded address in a byte position of "516 to 519"; a previous layer jump address on the L0 layer in a byte position of "520 to 523"; a jump interval in a byte position of "524 to 525"; an outermost address of the formatted area on the L0 layer in an address recording area 1031 which is in a byte position of "528 to 531"; an outermost address of the innermost-formatted area on the L1 layer in an address recording area 1032 which is in a byte position of "532 to 535"; an outermost address of the innermost-recorded area on the L1 layer in a byte position of "536 to 539"; and reserved areas.

Now, with reference to FIG. 9, a description is given on specific positions indicated by the outermost address of the formatted area on the L0 layer, which is recorded into the address recording area 1031, and the outermost address of the innermost formatted area on the L1 layer, which is recorded into the address recording area 1032. FIG. 9 are explanatory views showing specific positions indicated by the outermost address of the formatted area on the L0 layer, which is recorded into the address recording area 1031 and the outermost address of the innermost-formatted area on the L1 layer, which is recorded into the address recording area 1032.

As shown in FIG. 9(a), the outermost address of the formatted area on the L0 layer recorded in the address recording area 1031 indicates an address AD0. More specifically, the address AD0 of the edge portion on the outer circumferential side of an area 105a, which is a continuous recording area in the L0 layer to which the data area attribute is given and which is a recording area closest to the edge portion on the innermost side of the data area 105 (in other words, the innermost side of the optical disc 100), is recorded into the address recording area 1031 of the field 3 of the format 3RMD, as the outermost address of the formatted area on the L0 layer. That is, the attribute of the data area 105 (in particular, the data recordable area that does not include the lead-in area 102 nor the lead-out area 118) on the inner circumferential side of the address AD0 is the data area attribute.

In this case, since the optical disc adopts the opposite track path method, the address in the L0 layer increases from the inner circumferential side toward the outer circumferential side. Therefore, the largest address of the area 105a is recorded into the address recording area 1031, as the outermost address of the formatted area on the L0 layer.

In the same manner, the outermost address of the innermost-formatted area on the L1 layer recorded in the address recording area 1032 indicates an address AD1. More specifically, the address AD1 of the edge portion on the outer circumferential side of an area 115a, which is a continuous recording area in the L1 layer to which the data area attribute is given and which is a recording area closest to the edge portion on the innermost side of the data area 115 (in other words, the innermost side of the optical disc 100), is recorded into the address recording area 1032 of the field 3 of the format 3 RMD, as the outermost address of the innermost-formatted area on the L1 layer. That is, the attribute of the data area 115 (in particular, the data recordable area that does not include the lead-in area 102 nor the lead-out area 118) on the inner circumferential side of the address AD1 is the data area attribute.

In this case, since the optical disc adopts the opposite track path method, the address in the L1 layer decreases from the inner circumferential side toward the outer circumferential side. Therefore, the smallest address of the area 115a is recorded into the address recording area 1032, as the outermost address of the innermost-formatted area on the L1 layer.

In particular, in the example, even after the format process is performed on the optical disc 100, the address AD0 of the edge portion on the outer circumferential side of the area 105a, which is a continuous recording area in the L0 layer to which the data area attribute is given and which is a recording area closest to the edge portion on the innermost side of the data area 105, is recorded into the address recording area 1031. More specifically, the address of the edge portion on the outermost side of the area 105a is recorded, as long as the area 105a is physically present, even after the data recorded in the area 105a is logically deleted because the format process is performed on the optical disc 100. That is, the address of the edge portion on the outermost side of the recording area, which is a continuous recording area of the L0 layer physically existing on the optical disc 100, to which the data area attribute is given, and which is a recording area closest to the edge portion on the innermost side of the data area 105, is recorded into the address recording area 1031.

In the same manner, even after the format process is performed on the optical disc 100, the address AD1 of the edge portion on the outer circumferential side of the area 115a, which is a continuous recording area in the L1 layer to which the data area attribute is given and which is a recording area closest to the edge portion on the innermost side of the data area 115, is recorded into the address recording area 1032. More specifically, the address of the edge portion on the outermost side of the area 115a is recorded, as long as the area 115a is physically present, even after the data recorded in the area 115a is logically deleted because the format process is performed on the optical disc 100. That is, the address of the edge portion on the outermost side of the recording area, which is a continuous recording area of the L1 layer physically existing on the optical disc 100, to which the data area attribute is given, and which is a recording area closest to the edge portion on the innermost side of the data area 115, is recorded into the address recording area 1032.

Moreover, as shown in FIG. 9(*b*), in some cases, the areas 105*a* and 105*b* possibly exist, each of which is a continuous recording area in the L0 layer to which the data area attribute is given. In this case, the address AD0 of the edge portion on the outer circumferential side of the area 105*a*, which is a recording area closest to the edge portion on the innermost side of the data area 105, of the areas 105*a* and 105*b*, is recorded into the address recording area 1031 of the field 3 of the format 3 RMD, as the outermost address of the formatted area on the L0 layer. In the same manner, in some cases, the areas 115*a* and 115*b* possibly exist, each of which is a continuous recording area in the L1 layer to which the data area attribute is given. In this case, the address AD1 of the edge portion on the outer circumferential side of the area 115*a*, which is a recording area closest to the edge portion on the innermost side of the data area 115, of the areas 115*a* and 115*b*, is recorded into the address recording area 1032 of the field 3 of the format 3 RMD, as the outermost address of the innermost-formatted area on the L1 layer.

Incidentally, the "continuous recording area to which the data area attribute is given" means a series of recording area to which the attribute other than the data area attribute is not given. That is, in FIG. 9(*a*) and FIG. 9(*b*), each of the areas 105*a*, 105*b*, 115*a*, and 115*b* is a series of recording area to which the attribute other than the data area attribute is not given. On the other hand, since the shifted middle area 106, to which the middle area attribute other than the data area attribute is given, is formed between the areas 105*a* and 105*b*, an area which is obtained by combining the areas 105*a* and 105*b* is not the "continuous recording area to which the data area attribute is given".

Moreover, the address of the edge portion on the outermost side of the recording area, which is a continuous recording area to which the data area attribute is given and which is a recording area closest to the edge portion on the innermost side of the data recording area, is recorded into the address recording areas 1031 and 1032, as long as the continuous recording area to which the data area attribute is given exists on the optical disc 100, even after the format process is performed on the optical disc 100. More specifically, even after the data recorded on the information recording medium is logically deleted by performing the format process on the information recording medium, the address of the edge portion on the outermost side of the recording area, which is a continuous recording area to which the data area attribute is given and which is a recording area closest to the edge portion on the innermost side of the data recording area, is recorded, as long as the continuous recording area to which the data area attribute is given exists on the optical disc information recording medium.

(Information Recording/Reproducing Apparatus)

Next, with reference to FIG. 10, a description will be given on an information recording/reproducing apparatus 200, as an example of the information reproducing apparatus of the present invention. FIG. 10 is a block diagram conceptually showing the basic structure of the information recording/reproducing apparatus 200 in the example. Incidentally, the information recording/reproducing apparatus 200 has a function of recording data onto an optical disc 100 and a function of reproducing the data recorded on the optical disc 100.

As shown in FIG. 10, the information recording/reproducing apparatus 200 is provided with: a disc drive 300 on which the optical disc 100 is actually loaded and on which data recording and data reproduction are performed; and a host computer 400, such as a personal computer, for controlling the data recording and reproduction with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the holographic recording medium 1. More specifically, the spindle motor 351 is adapted to rotate and stop the optical disc 100 at a predetermined speed, under spindle servo from a not-illustrated servo unit or the like.

The optical pickup 352 is provided with e.g. a not-illustrated semiconductor laser element, collimator lens, objective lens, and the like, in order to perform the recording and the reproduction on the optical disc 100. More specifically, the optical pickup 352 irradiates the optical disc 100 with a light beam, such as a laser beam, with a first power as reading light in the reproduction, and with a second power and with it modulated as writing light in the recording.

The signal recording/reproducing device 353 constitutes one specific example of the "first recording device", the "second recording device", and the "formatting device" of the present invention, together with the CPU 354. The signal recording/reproducing device 353 controls the spindle motor 351 and the optical pickup 352 under the control of the CPU 354, to thereby perform the recording and the reproduction on the optical disc 100. More specifically, the signal recording/reproducing device 353 is provided with e.g. a laser diode driver (LD driver), a head amplifier, and the like. The laser diode driver generates e.g. a driving pulse and drives the semiconductor laser element disposed in the optical pickup 352. The head amplifier amplifies an output signal of the optical pickup 352, i.e. reflected light of the light beam, and outputs the amplified signal.

The memory 355 is used in the general data processing and an OPC process on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as the recorder equipment, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Typically, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record, to the CPU 359. The CPU 359 may transmit a control command to the information recording/reproducing apparatus 200, through the data input/output control device 308, on the basis of instruction information from the operation/display control device 307, to thereby control the entire disc drive 300. In the same manner, the CPU 359 can transmit a command for requesting the disc drive 300 to transmit an operational status to the host, with respect to the disc drive 300. By this, the operational status of the disc drive 300, such as during recording, can be recognized, so that the CPU 359 can output the operational status of the disc drive 301 to the display panel 311, such as a fluorescent tube and an LCD, through the operation/display control device 307.

The memory 360 is an internal memory apparatus used by the host computer 400, and it is provided with: a ROM area in which a firmware program, such as BIOS (Basic Input/Output System), is stored; a RAM area in which variables necessary for the operation of an operating system and an application program or the like are stored; and the like. Moreover, the memory 360 may be connected to an external memory apparatus, such as a not-illustrated hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

Moreover, in the example, the user data including various contents is recorded, while the attribute indicated by the area type is given, into the data areas 105 and 115. With the recording of the user data, the outermost address of the formatted area on the L0 layer and the outermost address of the innermost-formatted address on the L1 layer are recorded into the address recording area of the field 3 of the format 3 RMD.

Then, with reference to the outermost address of the formatted area on the L0 layer, which is recorded into the address recording area 1031, and the outermost address of the innermost-formatted address on the L1 layer, which is recorded into the address recording area 1032, the normal format process and the quick format process are performed, under the control of the CPU 354, which constitutes one specific example of the "controlling device" of the present invention.

Now, with reference to FIG. 11 and FIG. 12, a more detailed description is given on the normal format process and the quick format process, performed with reference to the outermost address of the formatted area on the L0 layer and the outermost address of the innermost-formatted area on the L1 layer. FIG. 11 are explanatory views conceptually showing one data structure of the optical disc after the quick format process is performed thereon. FIG. 12 are explanatory views conceptually showing another data structure of the optical disc after the quick format process is performed thereon.

As shown in FIG. 11(*a*), it is assumed that the middle area 106 is formed after a certain size of data is recorded into the L0 layer. And then, it is assumed that a command to perform the format process is given from the host computer 400 or the like while the format size is specified.

In this case, it is possible to recognize that the attribute of the recording area on the inner circumferential side of the position indicated by the outermost address of the formatted area on the L0 layer is the data are attribute. Thus, it is only necessary to perform the quick format process on the recording area on the outer circumferential side of the position indicated by the outermost address of the formatted area on the L0 layer. By this, as shown in FIG. 11(*b*), it is unnecessary to perform the quick format process on the entire format size requested from the host computer 400 or the like. That is, it is unnecessary to perform the format process on the recording area to which the data area attribute is already given.

Moreover, as shown in FIG. 12(*a*), the same can be true in the case that the data is recorded in each of the L0 layer and the L1 layer. Specifically, as shown in FIG. 12(*b*), it is only necessary to perform the quick format process on each of the recording area on the outer circumferential side of the position indicated by the outermost address of the formatted area on the L0 layer, and the recording area on the outer circumferential side of the position indicated by the outermost address of the innermost-formatted area on the L1 layer.

As described above, because the address recording areas 1031 and 1032 are provided, it is possible to preferably recognize that the data area attribute is already given to the recording areas on the inner circumferential side of the outermost address of the formatted area on the L0 layer and the outermost address of the innermost-formatted area on the L1 layer. Alternatively, it is possible to preferably recognize that there is no recording area to which the middle area attribute is given, for example, in the recording areas on the inner circumferential side of the outermost address of the formatted area on the L0 layer and the outermost address of the innermost-formatted area on the L1 layer. Therefore, if the quick format process is performed on a certain recording area bridging over the outermost address of the formatted area on the L0 layer and the outermost address of the innermost-formatted area on the L1 layer, it is enough to perform the format process on the recording areas on the outer circumferential side of the positions indicated by the outermost address of the formatted area on the L0 layer and the outermost address of the innermost-formatted area on the L1 layer. Moreover, in the case of not only the quick format process but also the normal format process, similarly, it is only necessary to perform the format process on the recording areas on the outer circumferential side of the positions indicated by the outermost address of the formatted area on the L0 layer and the outermost address of the innermost-formatted area on the L1 layer. By this, it is unnecessary to perform the format process on the recording area on which the format process does not need to be performed, resulting in a reduction in the time required for the format process. That is, the efficient format process can be performed.

Incidentally, in the aforementioned example, an explanation is given using the dual-layer type optical disc 100; however, not only the dual-layer type optical disc 100 but also a single-layer type optical disc with a single recording layer and an optical disc with three or more recording layers can also receive the aforementioned various benefits by adopting the aforementioned various structures.

Moreover, the information recording/reproducing apparatus 200 may be constructed to store the outermost address of the formatted area on the L0 layer and the outermost address of the innermost-formatted area on the L1 layer into the memory 355 or 360 of the information recording/reproducing apparatus 200, in addition to or instead of recording them into the address recording areas 1031 and 1032. Even such construction allows the aforementioned various benefits to be received by referring to the addresses stored in the memory 355 or 360 in performing the format process. Moreover, even if the data is recorded onto an optical disc that is not provided with the address recording areas 1031 nor 1032, the aforementioned various benefits can be received.

Incidentally, in the aforementioned example, an explanation is given on the optical disc 100 as one example of the information recording medium and the recorder related to the optical disc 100 as one example of the information recording apparatus; however, the present invention is not limited to the optical disc and the recorder thereof, and it can be also applied to other various information recording media which support high-density recording or high transmission rate, and recorders thereof.

The present invention is not limited to the aforementioned embodiment, but various changes may be made, if desired, without departing from the essence or spirit of the invention which can be read from the claims and the entire specification. An information recording medium, an information recording apparatus and method, and a computer program, all of which involve such changes, are also intended to be within the technical scope of the present invention.

Industrial Applicability

The information recording apparatus and method, and the computer program according to the present invention can be applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus for recording data onto an information recording medium in a rewritable manner, the information recording medium including a first recording layer and a second recording layer, each of the first recording layer and the second recording layer including at least a data recording area, and at least one of the first recording layer and the second recording layer includes an address recording area, the information recording apparatus comprising:

a first recording device that records the data into the data recording area in each of the first and second recording layers on the information recording medium such that the data is alternately recorded into the data recording area in the first recording layer and the data recording area in the second recording layer by a unit of a predetermined data size, while giving one attribute, which corresponds to the recorded data, of a plurality of types of attributes in each of segmentized area units;

a second recording device that records, into the address recording area on the information recording medium, i) an address of an outermost edge portion of a first continuous recording area, wherein i-1) the first continuous recording area is a continuous recording area to which a data area attribute of the plurality of types of attributes is given, and i-2) the first continuous recording area is a recording area closest to an innermost edge portion of the information recording medium in the first recording layer, and ii) an address of an outermost edge portion of a second continuous recording area, wherein ii-1) the second continuous recording area is the continuous recording area to which the data area attribute is given, and ii-2) the second continuous recording area is a recording area closest to an innermost edge portion of the information recording medium in the second recording layer, wherein the data area attribute indicating a status that user data is recorded as the data;

a formatting device that performs a format process on a desired recording area of the information recording medium; and a controlling device that controls said formatting device to start the format process toward an outer circumferential side from the outermost edge portion of the first and second continuous recording areas if the format process is performed on the predetermined recording area, wherein a) a start edge portion of the predetermined recording area is located on a more inner side than the outermost edge portions of the first and second continuous recording areas, and b) an end edge portion of the predetermined recording area is located on a more outer side than the outermost edge portions of the first and second continuous recording areas, wherein an address in said first recording layer increases from an inner circumferential side toward an outer circumferential side, wherein an address in said second recording layer decreases from the inner circumferential side toward the outer circumferential side, wherein the first recording device 1) records the data into the data recording area in each of the first and second recording layers by a unit of a plurality of the predetermined data size, 2) records the data, in the first recording layer, along a first direction that is from the inner circumferential side toward the outer circumferential side, 3) records the data, in the second recording layer, along a second direction that is from the outer circumferential side toward the inner circumferential side, and 4) forms a shifted middle area, by recording the data to which middle area attribute of the plurality of types of attributes is given, on an outer side of the data to which the data area attribute is given after the recording of the data to which the data area attribute is given is completed, wherein the second recording device records a largest address of the first continuous recording area as the address of the outermost edge portion of the first continuous recording area, wherein the second recording device records a minimum address of the second continuous recording area as the address of the outermost edge portion of the second continuous recording area, and wherein the controlling device controls the formatting device to overwrite the shifted middle area by the data to which the data area attribute is given, when the format process is performed with respect to the shifted middle area.

2. The information recording apparatus according to claim 1, wherein the plurality of types of attributes include at least one of a lead-in area attribute, a lead-out attribute, the data area attribute, and a middle area attribute.

3. The information recording apparatus according to claim 1, wherein the information recording medium further comprises a management data recording area to record therein management data for managing at least one of recording and reproduction of the data recorded in said data recording area,
said address recording area being located in said management data recording area.

4. An information recording method for recording data onto an information recording medium in a rewritable manner, the information recording medium comprised of a first recording layer and a second recording layer, each of the first recording layer and the second recording layer having at least a data recording area, and at least one of the first recording layer and the second recording layer includes an address recording area, the information recording method comprising:
a first recording step of recording the data into the data recording area in each of the first and second recording layers on the information recording medium such that the data is alternately recorded into the data recording area in the first recording layer and the data recording area in the second recording layer by a unit of a predetermined data size, while giving one attribute, which corresponds to the recorded data, of a plurality of types of attributes in each of segmentized area units;
a second recording step of recording, into the address recording area on the information recording medium, i) an address of an outermost edge portion of a first continuous recording area, wherein i-1) the first continuous recording area is a continuous recording area to which a data area attribute of the plurality of types of attributes is given and i-2) the first continuous recording area which is a recording area closest to an innermost edge portion of the information recording medium in the first recording layer, and ii) an address of an outermost edge portion of a second continuous recording area, wherein ii-1) the second continuous recording area is the continuous recording area to which the data area attribute is given and ii-2) the second continuous recording area is a recording area closest to an innermost edge portion of the information recording medium in the second recording layer, wherein the data area attribute indicating a status that user data is recorded as the data;
a formatting step of performing a format process on a desired recording area of the information recording medium; and
a controlling step of controlling said formatting process to start the format process toward an outer circumferential side from the outermost edge portions of the first and second continuous recording areas, if the format process is performed on the predetermined recording area,
wherein a) a start edge portion of the predetermined recording area is located on more inner side than the outermost edge portions of the first and second continuous recording areas, and b) an end edge portion of the predetermined recording area is located on more outer side than the outermost edge portions of the first and second continuous recording areas,
wherein an address in said first recording layer increases from an inner circumferential side toward an outer circumferential side,
wherein an address in said second recording layer decreases from the inner circumferential side toward the outer circumferential side,
wherein the first recording step 1) records the data into the data recording area in each of the first and second recording layers by a unit of a plurality of the predetermined data size, 2) records the data, in the first recording layer, along a first direction that is from the inner circumferential side toward the outer circumferential side, 3) records the data, in the second recording layer, along a second direction that is from the outer circumferential side toward the inner circumferential side, and 4) forms a shifted middle area, by recording the data to which middle area attribute of the plurality of types of attributes is given, on an outer side of the data to which the data area attribute is given after the recording of the data to which the data area attribute is given is completed,
wherein the second recording step records a largest address of the first continuous recording area as the address of the outermost edge portion of the first continuous recording area,
wherein the second recording step records a minimum address of the second continuous recording area as the address of the outermost edge portion of the second continuous recording area, and
wherein the controlling step controls the formatting process to overwrite the shifted middle area by the data to which the data area attribute is given, when the format process is performed with respect to the shifted middle area.

* * * * *